(12) United States Patent
Kuribayashi et al.

(10) Patent No.: US 10,477,191 B2
(45) Date of Patent: Nov. 12, 2019

(54) DISPLAY DEVICE, AND DISPLAY CONTROL PROGRAM

(71) Applicant: NIKON CORPORATION, Tokyo (JP)

(72) Inventors: Hidenori Kuribayashi, Tokyo (JP); Masaki Otsuki, Yokohama (JP); Kenzo Chiaki, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/359,166

(22) PCT Filed: Nov. 20, 2012

(86) PCT No.: PCT/JP2012/080107
§ 371 (c)(1),
(2) Date: May 19, 2014

(87) PCT Pub. No.: WO2013/077338
PCT Pub. Date: May 30, 2013

(65) Prior Publication Data
US 2014/0320615 A1   Oct. 30, 2014

(30) Foreign Application Priority Data

Nov. 21, 2011   (JP) .................................. 2011-253805

(51) Int. Cl.
*H04N 13/00*   (2018.01)
*H04N 13/31*   (2018.01)
(Continued)

(52) U.S. Cl.
CPC ............. *H04N 13/31* (2018.05); *G06F 3/017* (2013.01); *G06F 3/0304* (2013.01);
(Continued)

(58) Field of Classification Search
None
See application file for complete search history.

(56) References Cited

U.S. PATENT DOCUMENTS 6,346,929 B1   2/2002   Fukushima et al.
7,002,556 B2   2/2006   Tsukada et al.
(Continued)

FOREIGN PATENT DOCUMENTS

CN   1512456 A   7/2004
CN   101072366 A   11/2007
(Continued)

OTHER PUBLICATIONS

Sep. 17, 2015 Extended Search Report issued in European Patent Application No. 12851046.8.
(Continued)

*Primary Examiner* — Anand S Rao
*Assistant Examiner* — Tyler B Edwards
(74) *Attorney, Agent, or Firm* — Oliff PLC

(57) ABSTRACT

A display device includes a display unit that displays an image including a stereoscopic image based on binocular parallax, a detection unit that detects an obstacle that blocks the stereoscopic image, and a control unit that determines at least one of a display state and a blocking state of the stereoscopic image by the obstacle based on a detection result of the detection unit, and controls a display of a related image based on the determination result, the related image being related to the stereoscopic image.

31 Claims, 13 Drawing Sheets

(51) Int. Cl.
*G09G 3/00* (2006.01)
*G06F 3/03* (2006.01)
*G06F 3/01* (2006.01)
*G06F 3/0481* (2013.01)
*H04N 13/144* (2018.01)

(52) U.S. Cl.
CPC ......... *G06F 3/04815* (2013.01); *G09G 3/003* (2013.01); *G09G 2340/14* (2013.01); *G09G 2354/00* (2013.01); *H04N 13/144* (2018.05)

(56) References Cited

U.S. PATENT DOCUMENTS

| | | | |
|---|---|---|---|
| 7,692,629 | B2 | 4/2010 | Baudisch et al. |
| 8,299,980 | B2 | 10/2012 | Takahashi et al. |
| 8,416,268 | B2 | 4/2013 | Tomisawa et al. |
| 2002/0196238 | A1 | 12/2002 | Tsukada et al. |
| 2008/0136785 | A1 | 6/2008 | Baudisch et al. |
| 2009/0319935 | A1 | 12/2009 | Figura |
| 2010/0088633 | A1 | 4/2010 | Sakurada |
| 2010/0110384 | A1 | 5/2010 | Maekawa |
| 2011/0175797 | A1 | 7/2011 | Tomisawa et al. |
| 2011/0191707 | A1 | 8/2011 | Lee et al. |
| 2011/0298791 | A1 | 12/2011 | Adachi et al. |
| 2012/0032851 | A1 | 2/2012 | Horsey |
| 2012/0050501 | A1 | 3/2012 | Narita |
| 2012/0056989 | A1 | 3/2012 | Izumi |
| 2012/0069055 | A1 | 3/2012 | Otsuki et al. |
| 2012/0320047 | A1* | 12/2012 | Yanagita ............... G06F 3/0418 345/419 |
| 2013/0215149 | A1 | 8/2013 | Hayashi |

FOREIGN PATENT DOCUMENTS

| | | |
|---|---|---|
| CN | 101553775 A | 10/2009 |
| CN | 102005062 A | 4/2011 |
| EP | 2615523 A1 | 7/2013 |
| JP | A-9-190278 | 7/1997 |
| JP | H09-230287 A | 9/1997 |
| JP | 2000-089881 A | 3/2000 |
| JP | 2003-005912 A | 1/2003 |
| JP | 2004-302124 A | 10/2004 |
| JP | 2005-316790 A | 11/2005 |
| JP | 2010-092153 A | 4/2010 |
| JP | 2010092272 A * | 4/2010 |
| JP | 2010092272 A * | 4/2010 |
| JP | A-2010-92272 | 4/2010 |
| JP | 2011022958 A * | 2/2011 |
| JP | A-2011-22958 | 2/2011 |
| JP | A-2011-90611 | 5/2011 |
| JP | 2011-108152 A | 6/2011 |
| JP | 2011-175617 A | 9/2011 |
| KR | 10-2011-0076771 A | 7/2011 |
| WO | 2008/070815 A1 | 6/2008 |
| WO | 2010/080199 A1 | 7/2010 |

OTHER PUBLICATIONS

International Search Report issued in International Application No. PCT/JP2012/080107 dated Mar. 5, 2013 (with translation).
Written Opinion of the International Searching Authority issued in International Application No. PCT/JP2012/080107 dated Mar. 5, 2013 (with translation).
Jun. 30, 2016 Office Action Issued in Chinese Patent Application No. 201280067270.3.
Sep. 27, 2016 Office Action issued in Japanese Patent Application No. 2013-545939.
Nov. 3, 2016 Notification of the Results of the Patentability Analysis issued in Russian Patent Application No. 2014124192.
Feb. 28, 2017 Office Action issued in European Patent Application No. 12851046.8.
Nov. 23, 2017 Office Action issued in Chinese Patent Application No. 201280067270.3.
May 31, 2017 Office Action issued in Chinese Patent Application No. 201280067270.3.
Jun. 6, 2017 Office Action issued in Russian Patent Application No. 2014124192.
Jul. 4, 2017 Office Action issued in Japanese Patent Application No. 2013-545939.
Aug. 7, 2018 Office Action issued in Japanese Patent Application No. 2017-192348.
Aug. 23, 2018 Office Action issued in European Patent Application No. 12851046.8.
Sep. 17, 2018 Office Action issued in Chinese Patent Application No. 201280067270.3.
Jan. 31, 2019 Office Action issued in Chinese Patent Application No. 201280067270.3.
Feb. 27, 2019 Office Action issued in Russian Patent Application No. 2018119502.
Jul. 25, 2019 Office Action issued in Korean Patent Application No. 10-2014-7014205.

* cited by examiner (a)  (b)

DISPLAY DEVICE, AND DISPLAY CONTROL PROGRAM

TECHNICAL FIELD

The present invention relates to a display device and a display control program.

Priority is claimed on Japanese Patent Application No. 2011-253805, filed Nov. 21, 2011, the contents of which are incorporated herein by reference.

BACKGROUND

Three-dimensional displays showing a stereoscopic image to a user by showing different images to the left and right eyes are known. When viewing an image using the shutter type eyeglasses, preventing the occurrence of a double image by closing the shutter on one side of the shutter type eyeglasses so that an image reaches only to one eye when an image is blocked by the hand is disclosed in Patent Document 1.

RELATED ART DOCUMENTS

Patent Documents

[Patent Document 1] Japanese Unexamined Patent Application, First Publication No. 2011-90611

SUMMARY OF INVENTION

Problems to be Solved by the Invention

However, when the three-dimensional display displays an operator used to receive an input by, for example, the user's operation gesture as a stereoscopic image, if the user tries to press the operator with a finger or the like, the operator is no longer visible since the operator is blocked by the finger or the like.

According to aspects of the present invention, there are provided a display device and a display control program that display a stereoscopic image which is blocked by an obstacle so that the blocked stereoscopic image is able to be confirmed.

Means for Solving the Problem

An aspect of the present invention is a display device including: a display unit that displays an image including a stereoscopic image based on binocular parallax; a detection unit that detects an obstacle that blocks the stereoscopic image; and a control unit that determines at least one of a display state and a blocking state of the stereoscopic image by the obstacle based on a detection result of the detection unit, and controls display of a related image, based on the determination result, the related image being related to the stereoscopic image.

In addition, an aspect of the present invention is a display control program causing a computer of a display device to execute: a step of displaying an image including a stereoscopic image based on binocular parallax; a step of detecting an obstacle that blocks the stereoscopic image; and a step of determining at least one of a display state and a blocking state of the stereoscopic image by the obstacle based on a detection result and controlling display of a related image based on the determination result, the related image being related to the stereoscopic image.

Advantage of the Invention

According to the aspects of the present invention, it is possible to display a stereoscopic image which is blocked by an obstacle so that the blocked stereoscopic image is able to be confirmed.

DESCRIPTION OF EMBODIMENTS

Figure 1:
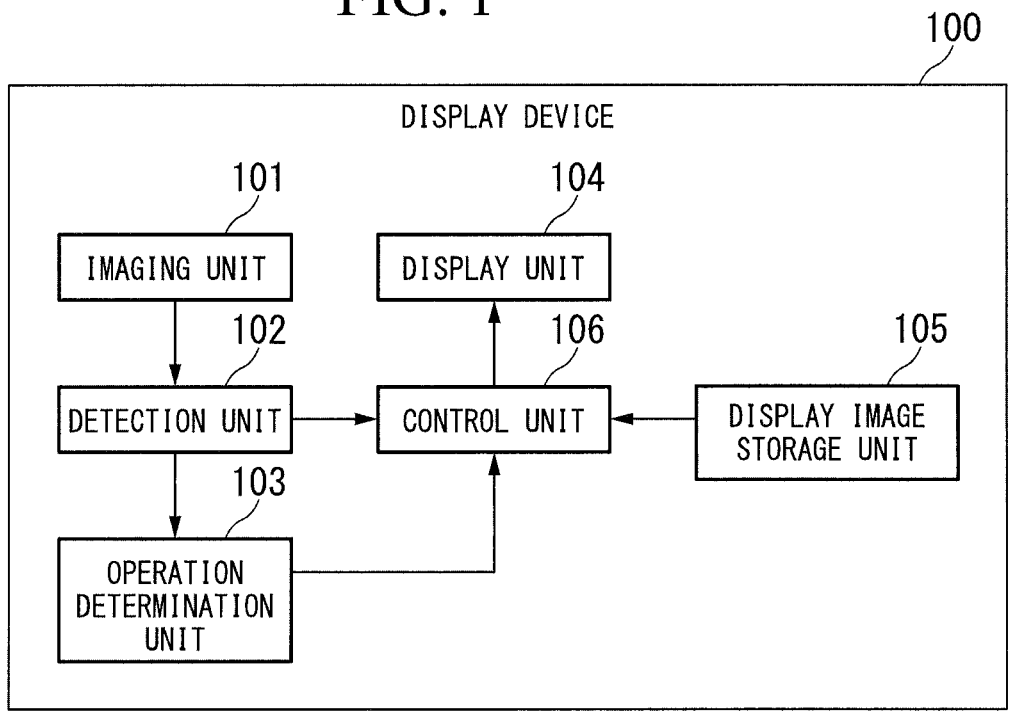
FIG. 1 is a block diagram showing an example of the configuration of a display device according to an embodiment of the present invention.

Hereinafter, an embodiment of the present invention will be described with reference to the diagrams. FIG. 1 is a block diagram showing the configuration of a display device 100 according to the present embodiment. The display device 100 includes an imaging unit 101, a detection unit 102, an operation determination unit 103, a display unit 104, a display image storage unit 105, and a control unit 106.

Figure 2:
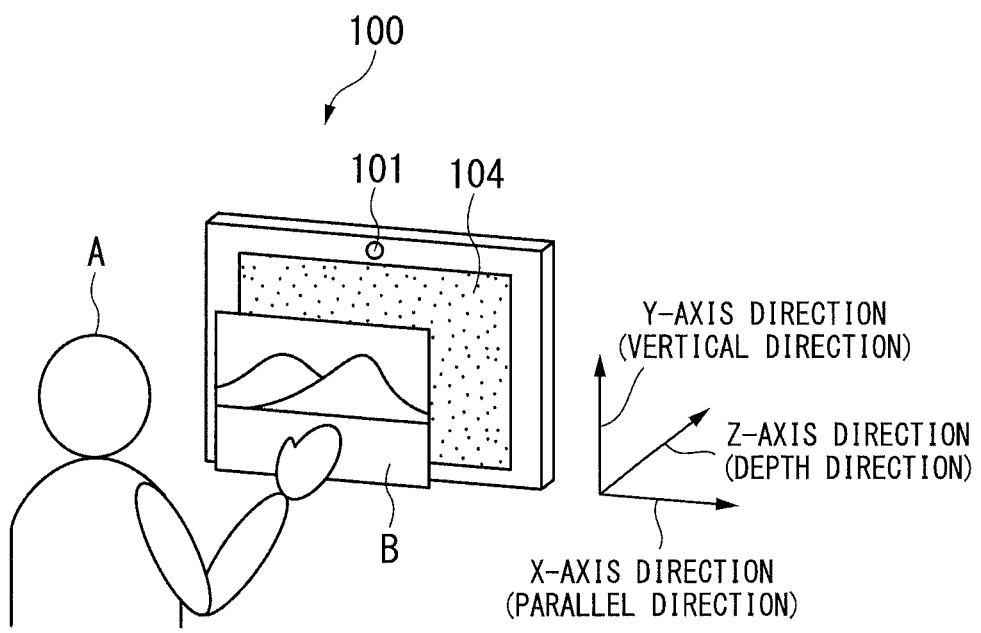
FIG. 2 is a diagram showing the appearance of the display device according to the embodiment of the present invention.

FIG. 2 is a diagram showing the appearance of the display device 100. The display device 100 is a three-dimensional display that displays a parallax image on a display screen of the display unit 104 and that shows a three-dimensional image B to a user A by showing an image with binocular parallax to the left and right eyes of the user A. The display device 100 may perform three-dimensional display using either a naked eye method or an eyeglass method. In the present embodiment, an example using the naked eye method will be described. In addition, any of the display principles, such as a liquid crystal display (LCD), plasma, and organic electroluminescence (EL), may be applied to the display device 100. The display device 100 includes the imaging unit 101, which images the user A, at the upper front. However, the imaging unit 101 may be provided, instead of the upper front of the display device, at a position where imaging can be performed in the display direction of the screen. In the present embodiment, explanation will be given on the assumption that a parallel (horizontal) direction with respect to the display unit 104 of the display device 100 is an X-axis direction, a vertical direction with respect to the display unit 104 is a Y-axis direction, and a depth direction with respect to the display unit 104 is a Z-axis direction.

Referring back to FIG. 1, the imaging unit 101 is a camera that generates a captured image by imaging a predetermined region in the display direction of the display unit 104. Here, the predetermined region is a region including a spatial region where a stereoscopic image displayed by the display unit 104 is blocked if an object is present when a user views the stereoscopic image. The imaging unit 101 may capture a moving image, or may capture a still image at fixed time intervals. The imaging unit 101 may be a camera, or may be a plurality of cameras. The imaging unit 101 may be a tilt type camera, or may be a fish-eye type camera.

Figure 3:
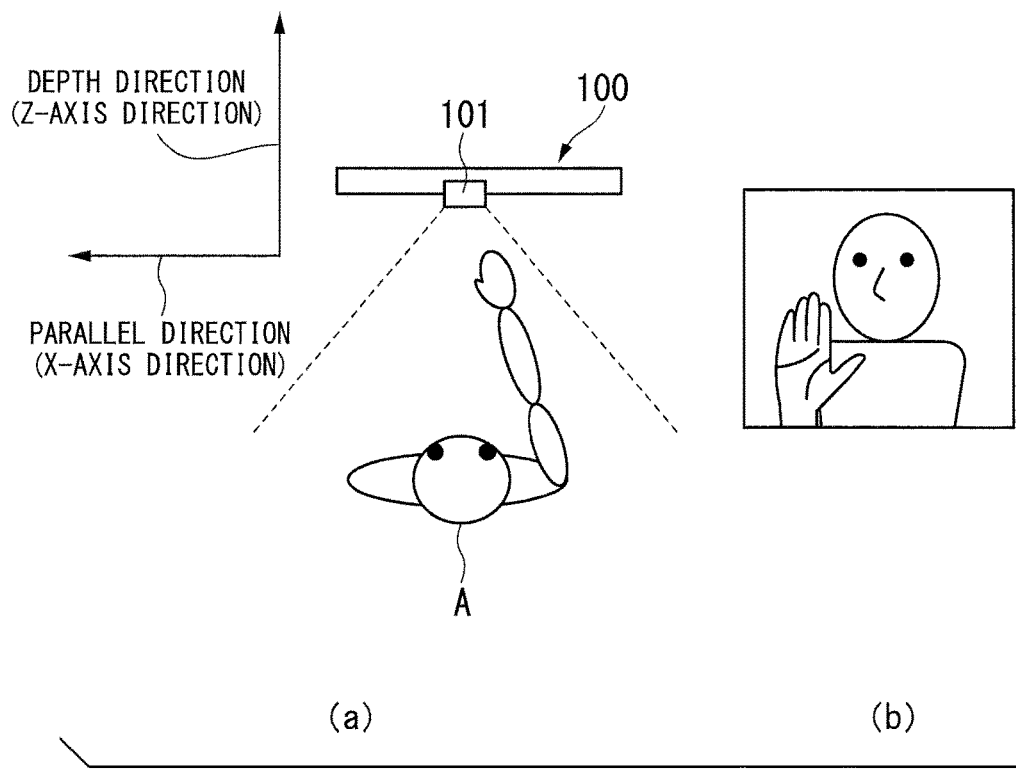
FIG. 3 is a diagram showing a positional relationship between a user and the display device according to the embodiment of the present invention.

The detection unit 102 detects an obstacle that blocks a stereoscopic image displayed by the display unit 104. For example, the detection unit 102 detects the position of an obstacle in a predetermined region in the display direction of the display unit 104 and the eye position of the user based on the captured image that has been captured by the imaging unit 101. For example, the detection unit 102 can analyze a captured image, which has been captured by the imaging unit 101, to detect a moving object included in the captured image. The detection unit 102 can extract a difference region for each frame of the moving image captured by the imaging unit 101 and determine that a moving object is present in a region where the difference occurs. For example, as shown in FIG. 3(a), the detection unit 102 detects the user A, who is present in the display direction of the display device 100, from the image captured by the imaging unit 101. In this case, for example, a captured image shown in FIG. 3(b) is captured by the imaging unit 101 of the display device 100.

The detection unit 102 detects at least one feature amount of the position of an obstacle in the depth direction (Z-axis direction) with respect to the display unit 104, the position of the obstacle in the parallel direction (X-axis direction) with respect to the screen of the display unit 104, the size of the obstacle, and the shape of the obstacle. Using a face detection algorithm, a hand region detection algorithm, or the like, the detection unit 102 detects a face region of the user A or a region of the hand as an obstacle, which is included in the captured image, and detects the position of the face or the position of the hand, the size of the face or the hand, and the shape of the face or the hand in three-dimensional space. When the face region of the user A cannot be detected from the captured image, the detection unit 102 can detect the position of the torso or arm of the user A and can calculate an estimated position of the face of the user A. In addition, the detection unit 102 can also detect an eye position of the user A from the position of the face of the user A that has been detected in this manner.

Figure 4:
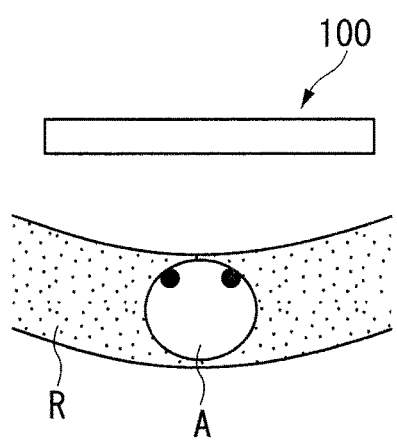
FIG. 4 is a diagram showing the positional relationship between a user and the display device according to the embodiment of the present invention.

When displaying a stereoscopic image using the naked eye method, the region of the eye position of the user A where the stereoscopic image can be observed is limited, as shown in FIG. 4. That is, a position of such an observable region R is known, and the eye position of the user A is set in advance. Therefore, the position of such an observable region may be stored in a storage region of the display device 100 in advance as the eye position of the user A.

The operation determination unit 103 determines an operation on the display device 100 according to the movement of a moving object detected by the detection unit 102. That is, the operation determination unit 103 receives an input of an operation gesture by a movement of the user A. For example, if a stereoscopic image of an operator is displayed at the position of the obstacle detected by the detection unit 102, the operation determination unit 103 determines that the operator has been depressed.

Figure 5:
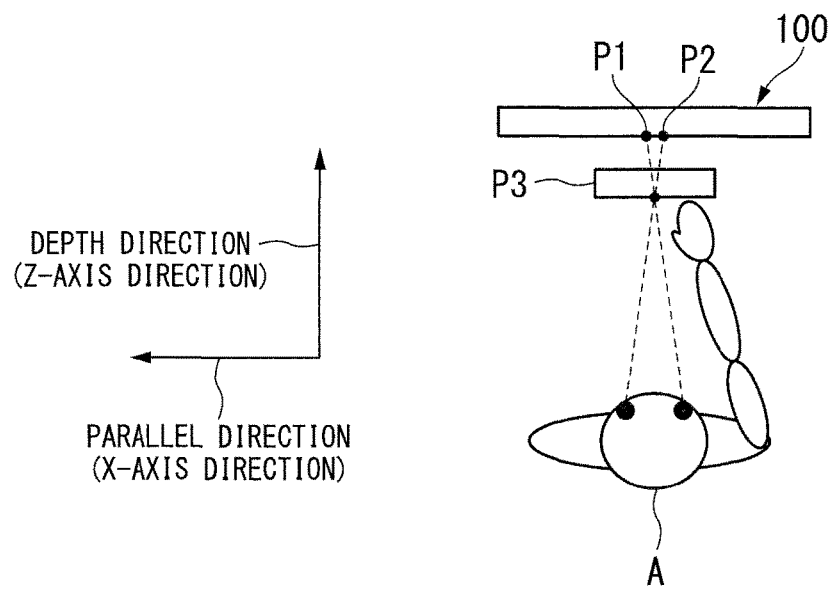
FIG. 5 is a diagram showing the general outline of a stereoscopic image displayed by a display unit according to the embodiment of the present invention.

The display unit 104 displays a stereoscopic image based on binocular parallax by changing an amount of parallax of a displayed image. FIG. 5 is a diagram showing the general outline of a stereoscopic image displayed by the display unit 104. When viewing the display unit 104 of the display device 100 from the position of the user A, a stereoscopic image based on binocular parallax can be displayed so that the stereoscopic image is projected to the display position of P3 in the depth direction from the display unit 104 by displaying a right-eye image applied to the right eye of the user A at the position of P1 and a left-eye image applied to the left eye of the user A at the position of P2.

Figure 6:
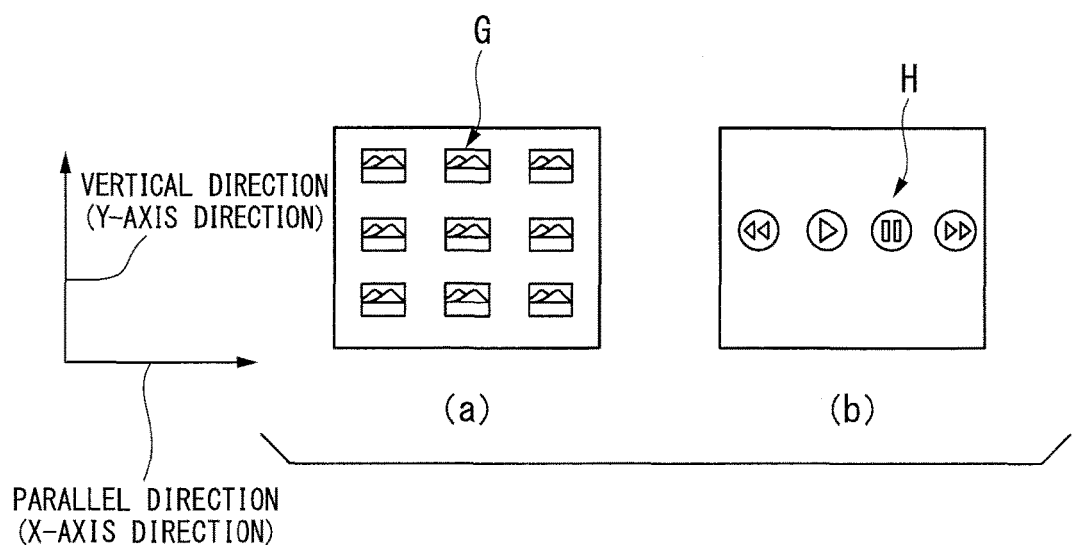
FIG. 6 is a diagram showing an example of a screen displayed by the display unit according to the embodiment of the present invention.

FIG. 6 is a diagram showing an example of a screen displayed by the display unit 104. FIG. 6(a) is an example in which a plurality of icons (for example, G) are displayed.

The display unit 104 can display each icon G as a stereoscopic image. FIG. 6(b) is an example in which a plurality of operators (for example, H) are displayed. The display unit 104 can display each operator H as a stereoscopic image.

Referring back to FIG. 1, a display image that is displayed on the display unit 104 is stored in the display image storage unit 105. The display image may be stored in the display image storage unit 105 in advance, or may be received from the outside through a wireless or wired network to be stored.

The control unit 106 reads the display image stored in the display image storage unit 105, generates a parallax image between the right-eye image and the left-eye image, and displays the parallax image on the display unit 104. The control unit 106 determines at least one of the display state and the blocking state of a stereoscopic image by an obstacle based on the detection result of a detection unit 102, and controls the display of a related image, which is related to the stereoscopic image, based on the determination result.

For example, based on the position of the obstacle (for example, a hand) and the eye position of the user, which have been detected by the detection unit 102, and the position of the display unit 104 set in advance, the control unit 106 determines a blocked region of an image blocked by the obstacle in a viewing direction with respect to the display unit 104 from the eye position of the user. As described above, the eye position of the user may be the estimated position of the face of the user calculated based on the position of the torso or arm of the user, or may be an observable region that is set in advance. For example, a blocked region of an image can be determined by connecting the eye position of the user and the display screen of the display unit 104 on a straight line and projecting an obstacle, which is present on the straight line, on the display screen based on the position, size, shape, and the like of the obstacle.

In addition, the control unit 106 determines whether or not the stereoscopic image is blocked by an obstacle, and displays a related image so as the related image is not to blocked by the obstacle when it is determined that the stereoscopic image is blocked by the obstacle. The control unit 106 controls the display position of the related image in a region, which is not blocked by the obstacle, based on the display position of the blocked stereoscopic image. That is, the control unit 106 determines at least one of the display state and the blocking state of the stereoscopic image blocked by the obstacle, and controls the display of the related image.

Figure 7:
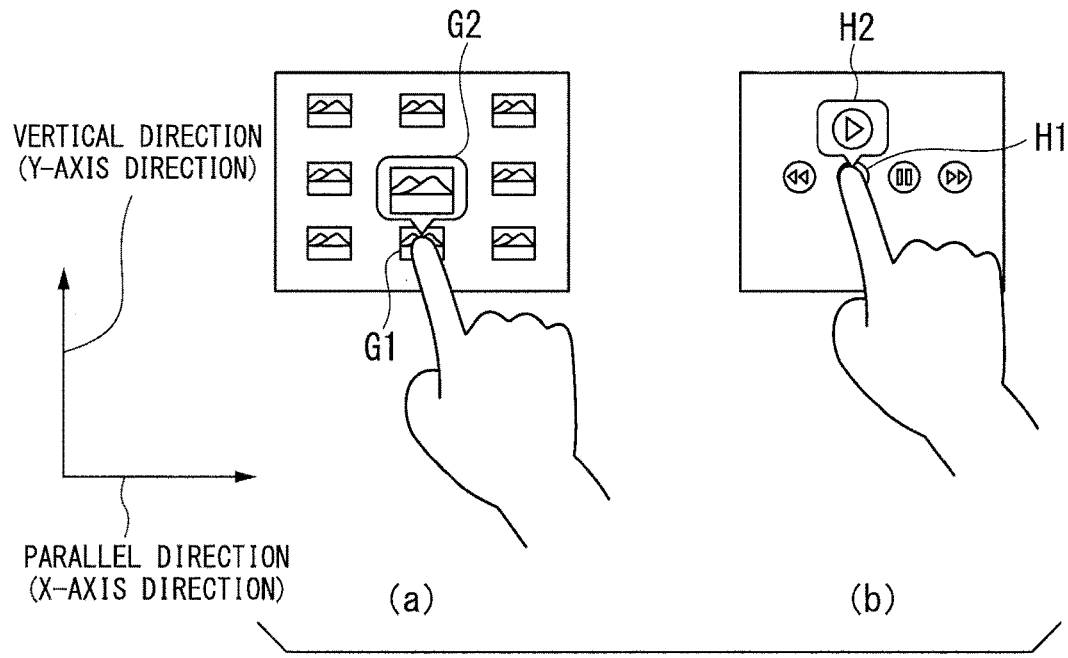
FIG. 7 is a diagram showing an example of a screen on which a related image is auxiliary displayed by the display unit according to the embodiment of the present invention.

For example, as shown in FIG. 7, the control unit 106 determines at least one of the display state and the blocking state of a stereoscopic image, and auxiliary displays a related image in a region adjacent to the stereoscopic image without being blocked by the obstacle. FIGS. 7(a) and 7(b) show a display example when a finger becomes close to the stereoscopic images shown in FIGS. 6(a) and 6(b).

In FIG. 7(a), a stereoscopic image G1 (hereinafter, simply referred to as an icon G1) is blocked by the finger (obstacle). Therefore, the control unit 106 auxiliary displays a related image G2 (hereinafter, simply referred to as an icon G2) of the blocked icon G1 in a region above the icon G1 that is a region adjacent to the icon G1 without being blocked by the obstacle (in the present embodiment, a finger). In this case, the auxiliary displayed icon G2 is displayed above the icon G1 with the same icon as the blocked icon G1 in a balloon shape (pop-up display) as shown in FIG. 7(a), for example. That is, the control unit 106 displays a related image so as to pop up in a region, which is adjacent to the stereoscopic image without being blocked by the obstacle, as the icon G2 shown in FIG. 7(a) or the icon H2 shown in FIG. 7(b). Thus, the control unit 106 determines a blocked region of an image (icon G1) blocked by an obstacle (in the present embodiment, a finger) and displays a related image (icon G2) in a region, which is different from the blocked region, of the region of the image, so that the user can confirm what the blocked stereoscopic image (icon G1) is by viewing the related image (icon G2) that is auxiliary displayed.

A same image as a blocked stereoscopic image may be included in a related image to be displayed. For example, in relation to a blocked stereoscopic image, it is preferable for the related image to be an image which recalls the blocked stereoscopic image. For example, the related image to be displayed may be an image showing the blocked stereoscopic image with letters.

In FIG. 7(a), an example is shown in which a related image is displayed in a region adjacent to the blocked stereoscopic image (icon G1) in the Y-axis direction (vertical direction). However, the related image can be displayed in a region adjacent to the blocked stereoscopic image (icon G1) in the X-axis direction (parallel direction). That is, a related image displayed in a region, which is not blocked by an obstacle, can be displayed at any position on the XY-axis plane.

Similarly, in FIG. 7(b), a stereoscopic image H1 (hereinafter, simply referred to as an operator H1) is blocked by the finger. Therefore, the control unit 106 auxiliary displays a related image H2 (hereinafter, simply referred to as an icon H2) of the blocked icon H1 in a region above the icon H1 that is a region adjacent to the icon H1 without being blocked by the obstacle (in the present embodiment, a finger).

The auxiliary displayed related image may be displayed in a stereoscopic manner similar to a stereoscopic image, or may be displayed in a two-dimensional manner on the display screen of the display unit 104. In addition, when it is determined that the obstacle detected by the detection unit 102 does not block the stereoscopic image, the control unit 106 hides the auxiliary display of related images.

Figure 8:
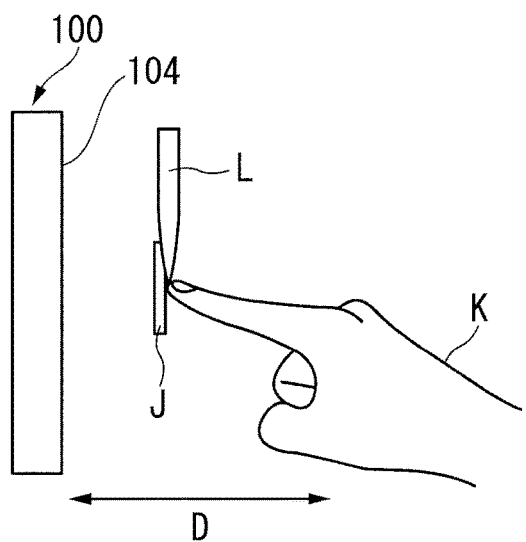
FIG. 8 is a diagram showing a relationship among a stereoscopic image, an obstacle, and a related image that is auxiliary displayed, according to the embodiment of the present invention.

FIG. 8 is a diagram showing the relationship of a depth distance D among the display device 100 that displays a stereoscopic image J, a hand K that is an obstacle, and a related image L that is auxiliary displayed. The depth distance D is a distance in the depth direction in the Z-axis direction. As shown in FIG. 8, the depth distance of the related image L that is auxiliary displayed can be made to be the same as that of the stereoscopic image J. Thus, it is possible to reduce eye fatigue of the user by reducing an abrupt change in the depth distance.

Figure 9:
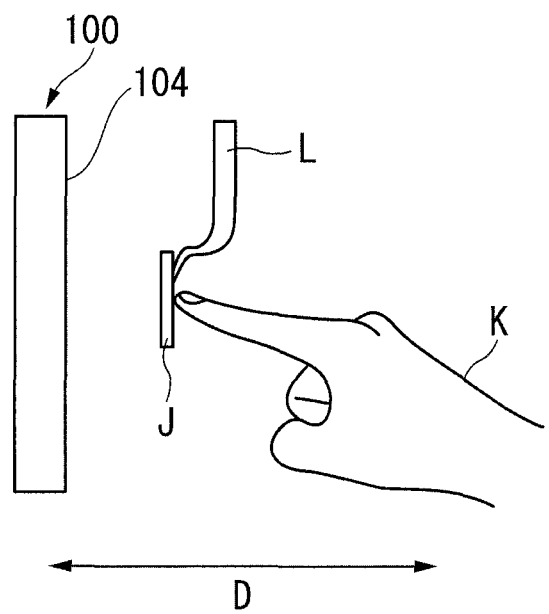
FIG. 9 is a diagram showing the relationship among a stereoscopic image, an obstacle, and a related image that is auxiliary displayed, according to the embodiment of the present invention.

As shown in FIG. 9, the control unit 106 can display the related image L, which is auxiliary displayed, at a position, which is farther from the display unit 104 than the stereoscopic image J (display position of a stereoscopic image) is, in the depth direction with respect to the display unit 104.

Figure 10:
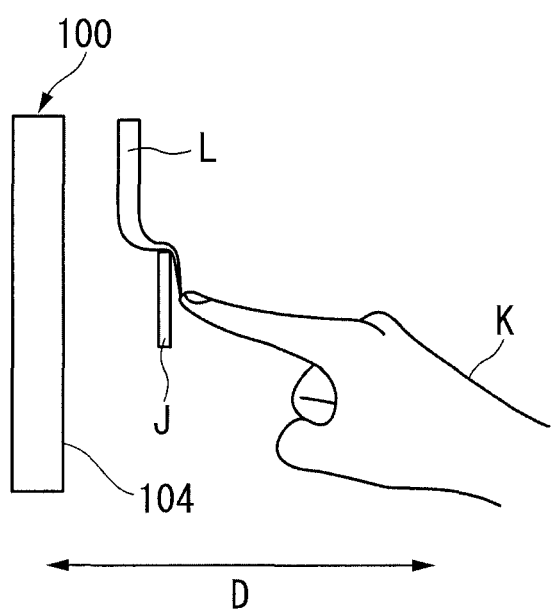
FIG. 10 is a diagram showing a relationship among a stereoscopic image, an obstacle, and a related image that is auxiliary displayed, according to the embodiment of the present invention.

In addition, as shown in FIG. 10, the control unit 106 can display the related image L, which is auxiliary displayed, at a position, which is closer to the display unit 104 than the stereoscopic image J is, in the depth direction with respect to the display unit 104. In addition, the control unit 106 can also display the related image L, which is auxiliary displayed, at a position on the display unit 104 in the depth direction with respect to the display unit 104.

Thus, by displaying the related image L in a stereoscopic manner at a different display position from the display position of the stereoscopic image J in the depth direction with respect to the display unit 104, it is possible to emphasize the related image L that is auxiliary displayed. In addition, it is possible to suppress the binocular rivalry of the user.

Figure 11:
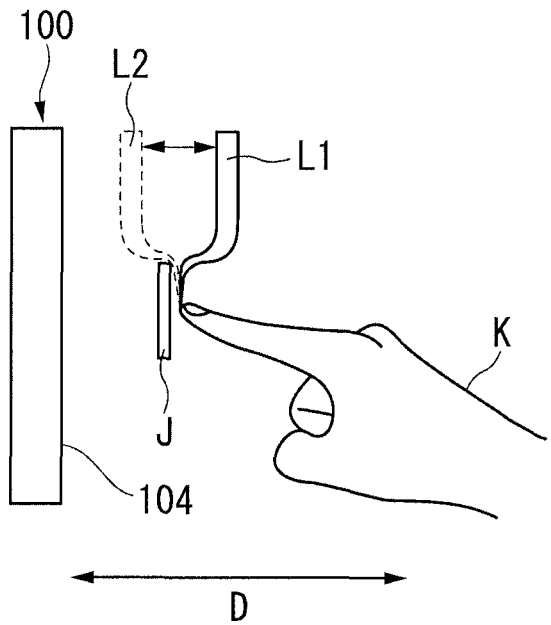
FIG. 11 is a diagram showing the relationship among the stereoscopic image, the obstacle, and the related image that is auxiliary displayed, according to the embodiment of the present invention.

In addition, as shown in FIG. 11, the control unit 106 can display the related image L, which is auxiliary displayed, so as to be dynamically changed between a position, which is farther from the display unit 104 than the stereoscopic image J is, and a position, which is closer to the display unit 104 than the stereoscopic image J is, over time (at every frame) in the depth direction with respect to the display unit 104. Thus, it is possible to emphasize the stereoscopic image L, which is auxiliary displayed, by changing the depth distance between the stereoscopic image J and the depth distance of the stereoscopic image L that is auxiliary displayed.

When it is determined that a stereoscopic image is included in the blocked region, the control unit 106 can also display an enlarged image of the stereoscopic image as a related image so that the stereoscopic image is not blocked by the obstacle.

In addition, the control unit 106 performs an action corresponding to an operation which is determined by the operation determination unit 103. For example, the control unit 106 controls an image displayed on the display unit 104 according to the input operation gesture.

Figure 12:
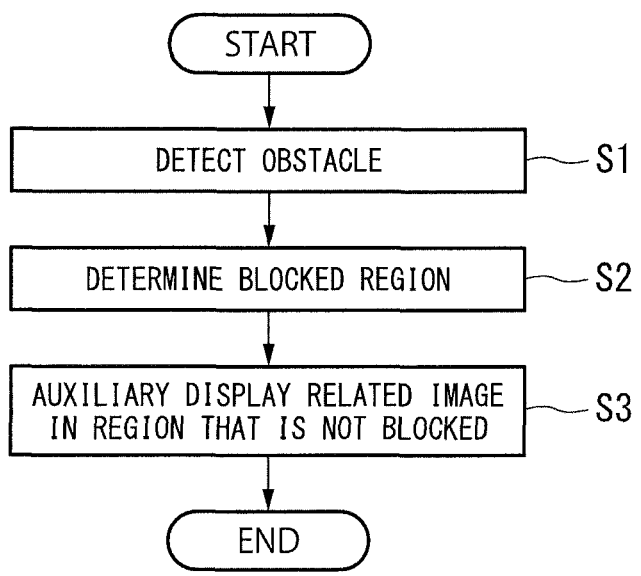
FIG. 12 is a flowchart showing an operation example of the display device according to the embodiment of the present invention.

Next, an operation example of the display device 100 according to the present embodiment will be described with reference to a diagram. FIG. 12 is a flowchart showing an operation example in which the display device 100 auxiliary displays a related image.

The control unit 106 reads a display image stored in the display image storage unit 105, generates a parallax image, and displays the parallax image on the display unit 104. The imaging unit 101 generates a captured image by performing imaging in a display direction in which the display unit 104 is displayed (for example, a direction in which the user is standing when looked from the display unit 104). When the detection unit 102 detects an obstacle from the captured image generated by the imaging unit 101 (step S1), the control unit 106 determines a blocked region of a stereoscopic image by the obstacle (step S2). The control unit 106 determines at least one of the display state and the blocking state of the stereoscopic image, and auxiliary displays a related image in a region of the display unit 104 that is not blocked by the obstacle (step S3). In addition, when it is determined that no obstacle has been detected by the detection unit 102, the control unit 106 hides the auxiliary display of related images.

As described above, according to the present embodiment, when a stereoscopic image displayed by the display device 100 is blocked by the finger or the like, a related image is auxiliary displayed in a region that is not blocked among the image displayed by the display unit 104. Therefore, the user can confirm what the blocked stereoscopic image is by viewing the related image that is auxiliary displayed. Since the related image that is auxiliary displayed is not blocked by the obstacle, the user can view the related image with both eyes. As a result, it is possible to reduce eye fatigue of the user without causing any discomfort of the user, such as binocular rivalry.

For example, a digital photograph frame, a digital signage, a home television, and the like can be applied to a three-dimensional display that is the display device 100 in the present embodiment. Alternatively, a smart phone in which a three-dimensional display is possible may also be applied. In this case, for example, a portion touched in a touch panel can be determined as a blocked region. Alternatively, if a touch panel having non-contact spatial sensitivity is applied, a blocked region can be similarly determined in a non-contact state. In this case, for example, the operation determination unit 103 can perform a control such that a stereoscopic image, which is an operator, is displayed when a finger touches (taps) the stereoscopic image and such that the operator is selected when the stereoscopic image is depressed. Alternatively, when an obstacle, for example, a finger is detected in a predetermined region, it is possible to perform a control to bring the stereoscopic image close to the position of the finger, and perform a control such that an auxiliary display of a related image is displayed when the stereoscopic image is blocked by the finger and such that the depressed operator is selected when the stereoscopic image is blocked by the finger.

In addition, the control unit 106 can also change the display position of the related image, which is auxiliary displayed, dynamically on the XY-axis plane.

In the present embodiment, an example is shown in which, when a stereoscopic image is blocked, a related image is displayed in a region adjacent to the stereoscopic image in the X-axis direction or the Y-axis direction. However, when a stereoscopic image can be displayed in a way visible to the user by changing the stereoscopic image in the Z-axis direction depending on an angle between of the eye position of the user, an obstacle, and a display unit, the display position may be changed in the Z-axis direction.

The control unit 106 may determine at least one of the display state and the blocking state of a stereoscopic image and determine a blocked region of the stereoscopic image blocked by an obstacle, and display a related image, which is auxiliary displayed, based on the ratio of the blocked region with respect to the stereoscopic image. For example, the related image may be displayed larger if the ratio of the blocked region to the stereoscopic image is large, or the related image may be displayed smaller so that the related image is not blocked if the ratio of the blocked region to the stereoscopic image is small.

As another method of displaying a related image, the following example can be considered. For example, an example of a "shift-display" can be considered in which, when a stereoscopic image is blocked by an obstacle, the control unit 106 determines at least one of the display state and the blocking state of the blocked stereoscopic image and displays a related image just as a moving stereoscopic image which moves from the position where the stereoscopic image is displayed before being blocked by the obstacle to a region that is not blocked by the obstacle.

In FIG. 13(a), an icon M1 indicates a stereoscopic image that is displayed before being blocked by the obstacle, an icon M2 indicates a related image that is displayed by the "shift-display" of the icon M1, and the shift amount SF indicates a distance by which the icon M1 is shifted from the position of the icon M1 to the position of the icon M2 by the "shift-display". For example, when the icon M1 is blocked by an obstacle, such as a finger, the control unit 106 determines at least one of the display state and the blocking state of the blocked stereoscopic image, and displays the icon M2 (related image) as a "shift display" at a position of the icon M2 (related image) which is a position in which the icon M1 was moved by the shift amount SF from the position where the icon M1 was displayed before being blocked by the obstacle.

Figure 13:
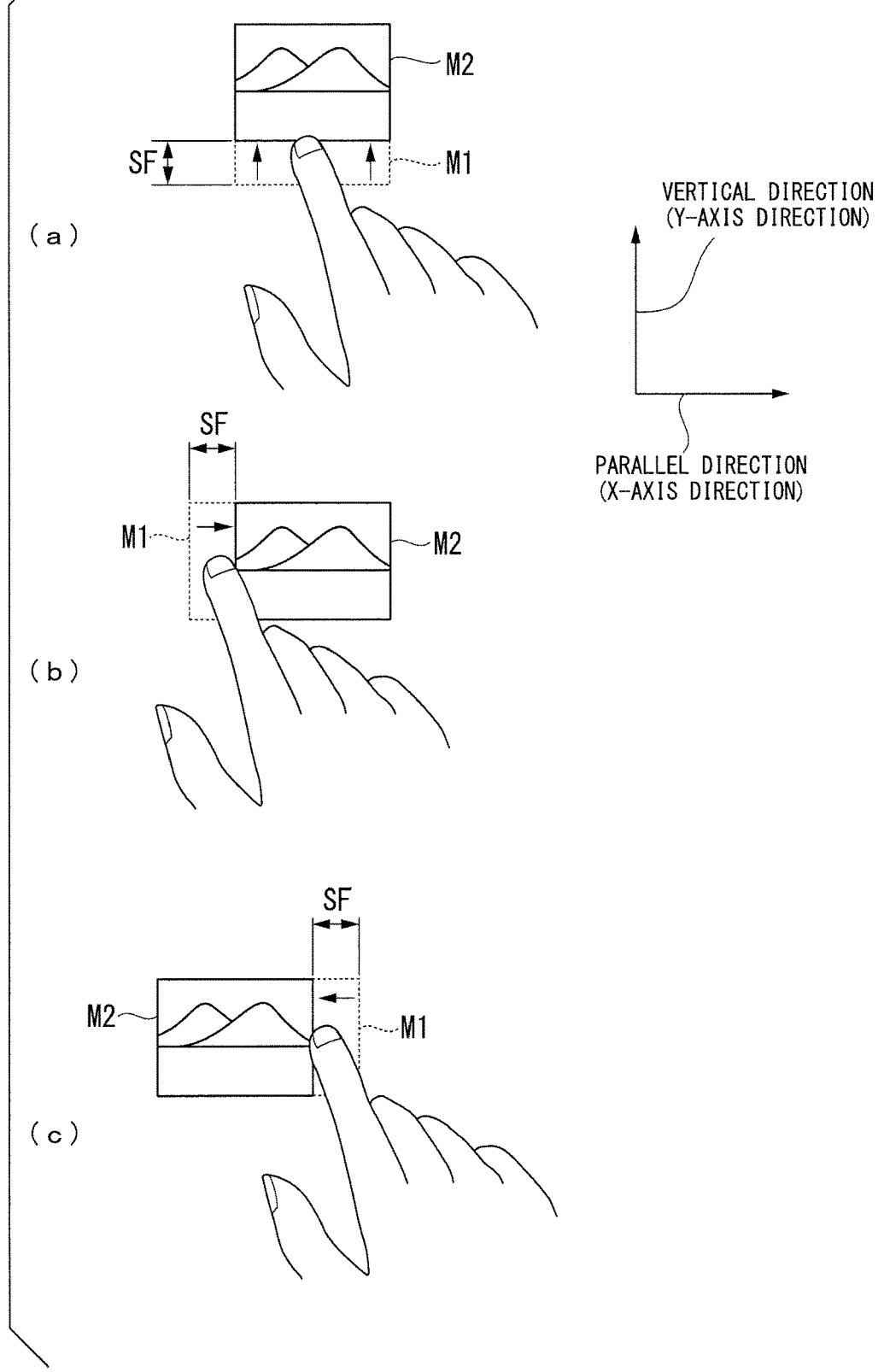
FIG. 13 is a diagram showing an example of a screen on which a related image is auxiliary displayed by a display unit according to another embodiment of the present invention.

FIG. 13(a) shows an example in which the icon M2 is displayed by "shift display" such as shifting the icon M1 in a vertical direction. However, a direction in which the icon M2 is shifted and displayed is not limited to the vertical direction, and may be any direction including a parallel direction with respect to the icon M1 as shown in FIGS. 13(*b*) and 13(*c*).

In addition, FIG. 13 shows an example in which the display of the icon M1 is hidden and the icon M2, which is a related image, is "shift displayed". However, the icon M2, which is a related image, may also be "shift displayed" while maintaining the display of the icon M1.

Thus, according to the present embodiment, when a stereoscopic image is blocked by an obstacle, a related image, just as a moving stereoscopic image which moves from the position where the stereoscopic image is displayed before being blocked by the obstacle to a region that is not blocked by the obstacle, is displayed as the "shift-display". Therefore, the user can confirm more clearly what the blocked stereoscopic image is by viewing the related image that is auxiliary displayed. In addition, by performing the "shift-displaying" of the related image of the blocked stereoscopic image, it is possible to highlight the content of the stereoscopic image so as to make it easily recognizable by the user. Furthermore, since the "shift-displayed" related image is not blocked by the obstacle, the user can view the related image with both eyes. As a result, it is possible to reduce eye fatigue of the user without causing any discomfort of the user, such as binocular rivalry.

In addition, as another method of displaying a related image, the following example can be considered. For example, an example of a "enlarge display" can be considered in which the control unit 106 determines at least one of the display state and the blocking state of a blocked stereoscopic image, and displays a related image just as an enlarged image of the stereoscopic image which is blocked by the obstacle so that the blocked region of the stereoscopic image by the obstacle becomes relatively small.

Figure 14:
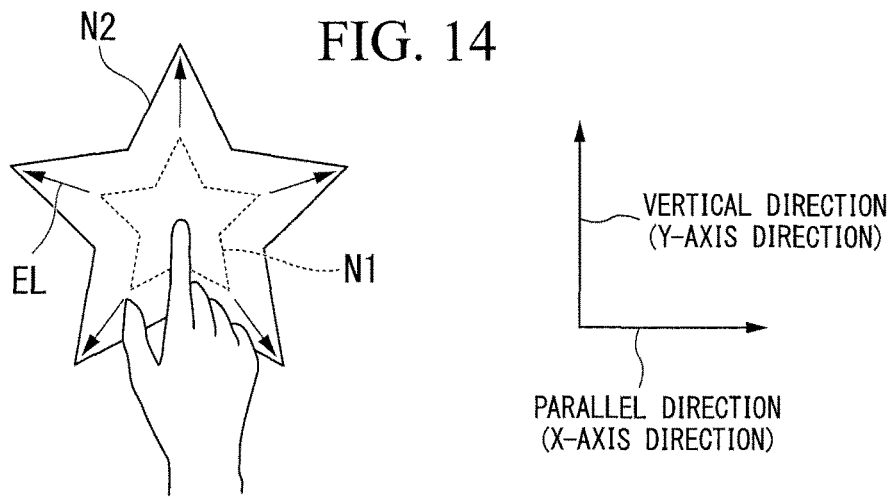
FIG. 14 is a diagram showing an example of a screen on which a related image is auxiliary displayed by a display unit according to another embodiment of the present invention.

In FIG. 14, an icon N1 indicate a stereoscopic image that is displayed before being blocked, an icon N2 indicates a related image that is displayed by enlarging the icon N1, and an amount of enlargement EL indicates the amount of enlargement when enlarging the icon N1 to the icon N2. For example, when the icon N1 is blocked by an obstacle, such as a finger, the control unit 106 determines at least one of the display state and the blocking state of the blocked stereoscopic image and displays the icon N2, which is an enlarged display of the icon N1 (stereoscopic image) before being blocked, as a related image.

In addition, FIG. 14 shows an example in which the display of the icon N1 is turned off and the icon N2, which is a related image, is displayed in an enlarged manner. However, the icon N2, which is a related image, may also be displayed in an enlarged manner while maintaining the display of the icon N1.

Thus, according to the present embodiment, when a stereoscopic image is blocked by an obstacle, a related image which has enlarged the blocked stereoscopic image is displayed as an "enlarge display" so that the blocked region of the stereoscopic image by the obstacle becomes relatively small. Therefore, the user can confirm more clearly what the blocked stereoscopic image is by viewing the related image that is auxiliary displayed. In addition, by performing the "enlarge display" of the related image of the blocked stereoscopic image, it is possible to highlight the content of the stereoscopic image so as to make it easily recognizable by the user. Since the related image displayed in an enlarged manner is not blocked by the obstacle, the user can view the related image with both eyes. As a result, it is possible to reduce eye fatigue of the user without causing any discomfort of the user, such as binocular rivalry.

The binocular rivalry is less likely to occur as a blocked region by an obstacle decreases among the object that the user is looking at. Therefore, by performing the "enlarge display" of the related image of the blocked stereoscopic image as described in the example shown in FIG. 14, a region blocked by the obstacle in the entire region of the stereoscopic image is relatively reduced. As a result, it is possible to suppress the occurrence of binocular rivalry.

Figure 15:
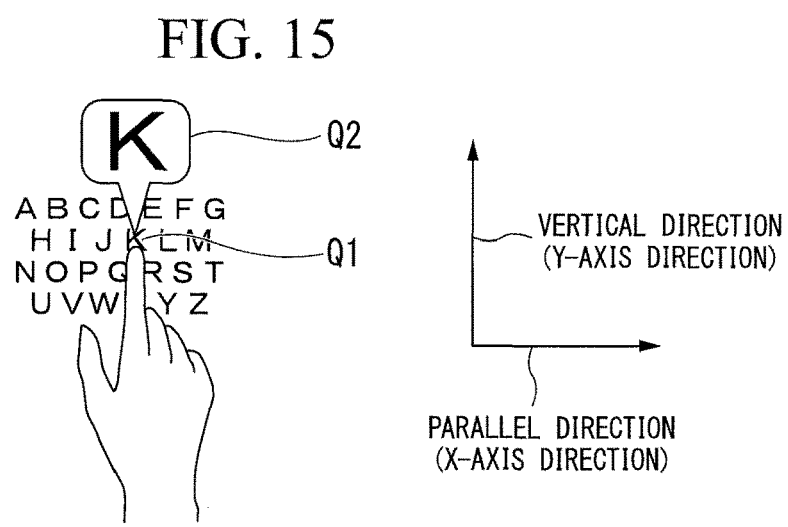
FIG. 15 is a diagram showing an example of a screen on which a related image is auxiliary displayed by a display unit according to another embodiment of the present invention.

In addition, as another method of displaying a related image, the following example can be considered. For example, as shown in FIG. 15, an example can be considered in which the control unit 106 determines at least one of the display state and the blocking state of a blocked stereoscopic image, and displays a related image, which is auxiliary displayed, at a position away from the stereoscopic image as a density or distribution of a texture around the stereoscopic image, which is an object to be pointed, increases. More specifically, for example, when a surroundings of a stereoscopic image blocked by an obstacle is a document or the like having a large texture density or distribution, binocular rivalry of the user who views the blocked stereoscopic image is likely to occur. For this reason, an example can be considered in which the control unit 106 displays the related image by selecting or changing a display method for a related image which is auxiliary displayed in accordance with the texture density or distribution around the blocked stereoscopic image.

In FIG. 15, an icon Q1 indicates a blocked stereoscopic image, and an icon Q2 indicates a related image which is displaying the icon Q1 by using a combination of "pop-up display" and "enlarge display". For example, a document having a large texture density or distribution is displayed around the icon Q1. For example, when the texture density or distribution around the blocked stereoscopic image is large as described above, the control unit 106 displays the icon Q2 as a related image by performing the "pop-up display" and the "enlarge display" of the blocked icon Q1 (stereoscopic image) when the icon Q1 is blocked by an obstacle, such as a finger.

In FIG. 15, a display method combining the "pop-up display" and the "enlarge display" is shown as an example of displaying a related image, which is auxiliary displayed, at a position away from a stereoscopic image, which is an object to be pointed, as the texture density or distribution around the stereoscopic image is larger.

Thus, according to the present embodiment, when a stereoscopic image is blocked by an obstacle, a related image is displayed at a position away from a stereoscopic image, which is an object to be pointed, as the texture density or distribution around the stereoscopic image is larger. Therefore, the user can confirm more clearly what the blocked stereoscopic image is by viewing the related image that is auxiliary displayed. In addition, by performing the "pop-up display" and the "enlarge display" of the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

In a region where the texture density or distribution is high, binocular rivalry is even more likely to occur. In the example of the display method shown in FIG. 15, an enlarged related image is displayed at a position away from a region where binocular rivalry is likely to occur, by using an auxiliary display combining the "pop-up display" and the "enlarge display". Therefore, it is possible to suppress the binocular rivalry more effectively.

On the other hand, when the texture density or distribution of the stereoscopic image, which is an object to be pointed, is small, binocular rivalry is less likely to occur even if a auxiliary displayed related image is displayed at a position close to the stereoscopic image. Therefore, a related image may be displayed using only the "pop-up display" or the "shift display".

Figure 16:
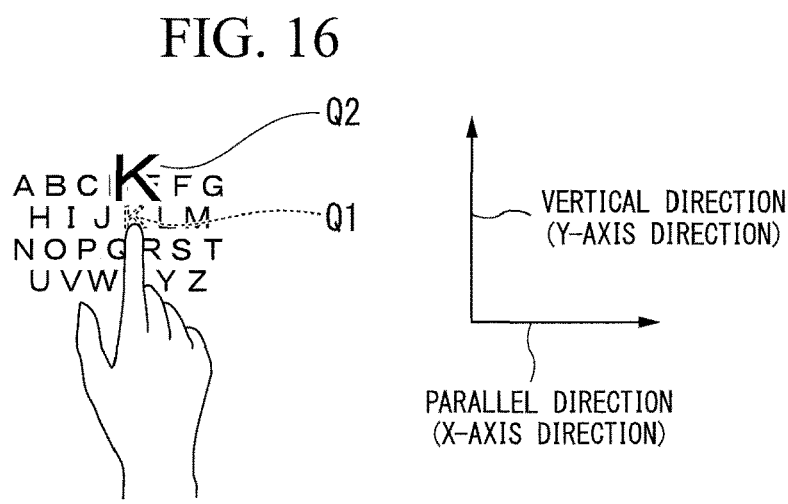
FIG. 16 is a diagram showing an example of a screen on which a related image is auxiliary displayed by a display unit according to another embodiment of the present invention.

In addition, as another method of displaying a related image, the following example can be considered. For example, as shown in FIG. 16, an example can be considered in which the control unit 106 determines at least one of the display state and the blocking state of a blocked stereoscopic image, and auxiliary displays a related image according to a relative size difference between the stereoscopic image, which is an object to be pointed, and an obstacle (for example, a finger or the like). More specifically, for example, when obstacles that block the same stereoscopic image are a finger of a child and a finger of an adult, regions of the stereoscopic image hidden by the fingers are different. Thus, an example can be considered in which the control unit 106 displays the related image by selecting or changing a display method of a related image to be auxiliary displayed according to the relative size difference between a blocked stereoscopic image and an obstacle.

In FIG. 16, an icon Q1 indicates a stereoscopic image that is displayed before being blocked, and an icon Q2 indicates a related image that is displayed by performing the "shift display" to the icon Q1. For example, a document having a large texture density or distribution is displayed around the icon Q1. For example, when the texture density or distribution around the blocked stereoscopic image is large as described above, the control unit 106 displays the icon Q2 as a related image by performing the "pop-up display" and the "enlarge display" of the icon Q1 (stereoscopic image), which is displayed before being blocked, when the icon Q1 is blocked by an obstacle, such as a finger.

In FIG. 16, a display method combining the "shift display" and the "enlarge display" is shown as an example of displaying a related image, which is auxiliary displayed, at a position away from a stereoscopic image, which is an object to be pointed, as the relative size difference between the stereoscopic image and the obstacle (for example, a finger or the like) is smaller.

Thus, according to the present embodiment, when a stereoscopic image is blocked by an obstacle, a related image is displayed at a position away from a stereoscopic image, which is an object to be pointed, according to the relative size difference between the stereoscopic image and the obstacle. Therefore, the user can confirm more clearly what the blocked stereoscopic image is by viewing the related image that is auxiliary displayed. In addition, by performing the "shift display" and the "enlarge display" of the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

In addition, when the relative size difference between a stereoscopic image and an obstacle (for example, a finger or the like) is small and most of the stereoscopic image is hidden by the obstacle, binocular rivalry is even more likely to occur. In the example of the display method shown in FIG. 16, an enlarged related image is displayed at a position away from a region, in which binocular rivalry is likely to occur, by using an auxiliary display combining the "shift display" and the "enlarge display". Therefore, it is possible to suppress the binocular rivalry more effectively.

In contrast, when the relative size difference between a stereoscopic image, which is an object to be pointed, and an obstacle (for example, a finger or the like) is large and most of the stereoscopic image is not hidden by the obstacle, binocular rivalry is less likely to occur even if a auxiliary displayed related image is displayed at a position close to the stereoscopic image. Therefore, a related image may be displayed using only the "pop-up display" or the "shift display".

Figure 17:
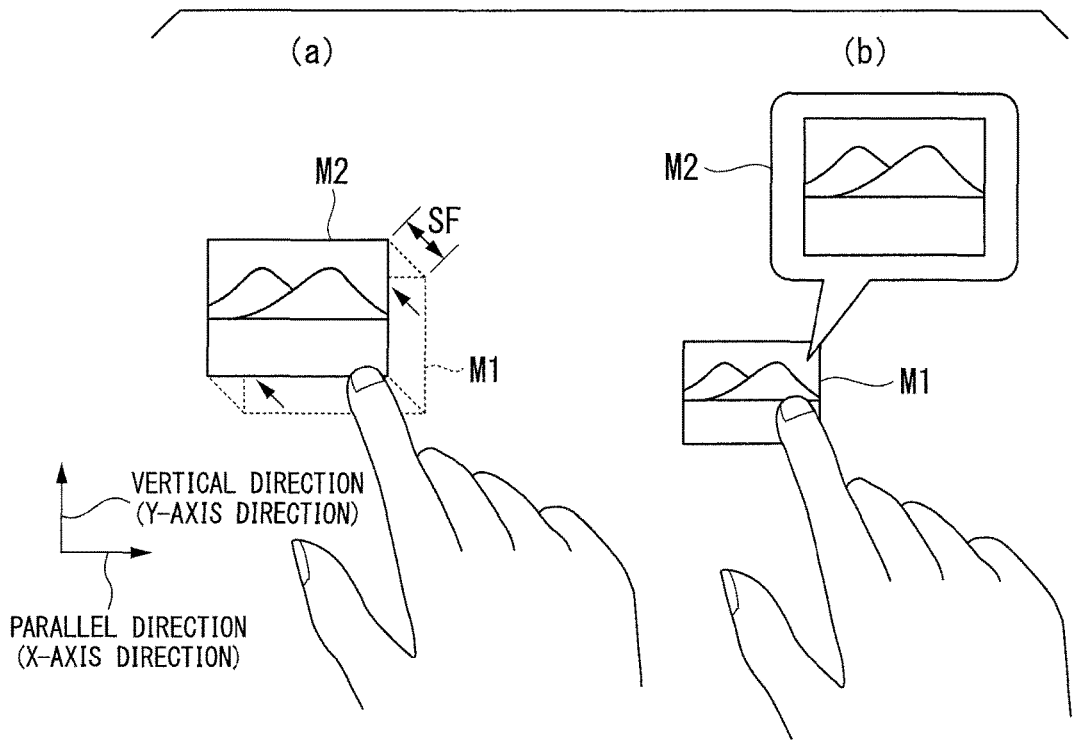
FIG. 17 is a diagram showing an example of a screen on which a related image is auxiliary displayed by a display unit according to another embodiment of the present invention.

In addition, as another method of displaying a related image, the following example can be considered. For example, as shown in FIG. 17, an example can be considered in which the control unit 106 determines at least one of the display state and the blocking state of a blocked stereoscopic image and the control unit 106 auxiliary displays a related image according to a relative positional relationship between the stereoscopic image, which is an object to be pointed, and an obstacle (for example, a finger or the like). More specifically, for example, an example can be considered in which the control unit 106 displays the related image by selecting or changing a display position or a display method of a related image to be auxiliary displayed according to a portion of a stereoscopic image blocked by an obstacle.

In FIG. 17(a), an icon M1 indicates a stereoscopic image that is displayed before being blocked, an icon M2 indicates a related image that is displayed by performing the "shift display" to the icon M1, and the shift amount SF indicates a distance by which the icon M1 is shifted from the position of the icon M1 to the position of the icon M2 by the "shift display".

In FIG. 17(a), as an example in which a related image is displayed according to the relative positional relationship between a stereoscopic image, which is an object to be pointed, and an obstacle (for example, a finger or the like), a display method is shown in which, when a lower right portion of a stereoscopic image is blocked by an obstacle, the control unit 106 performs the "shift display" in which the stereoscopic image is shifted in an upper left direction of the blocked stereoscopic image.

In FIG. 17(b), an icon M1 indicates a blocked stereoscopic image, and an icon M2 indicates a related image that is displayed by performing the "pop-up display" of the icon M1.

In FIG. 17(b), as another example in which a related image is displayed according to the relative positional relationship between a stereoscopic image, which is an object to be pointed, and an obstacle (for example, a finger or the like), a display method is shown in which, when a lower right portion of a stereoscopic image is blocked by an obstacle, the control unit 106 performs the "pop up display" of the stereoscopic image to an upper right direction of the blocked stereoscopic image.

Thus, according to the present embodiment, when a stereoscopic image is blocked by an obstacle, a related image is displayed according to the relative positional relationship between the blocked stereoscopic image and the obstacle. Therefore, the user can confirm more clearly what the blocked stereoscopic image is by viewing the related image that is auxiliary displayed. In addition, by auxiliary displaying the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

The direction shown in FIG. 17 in which a related image according to the relative positional relationship between the blocked stereoscopic image and the obstacle is displayed is not limited to the example described above, and may be any direction in which a related image to be displayed is not blocked.

Figure 18:
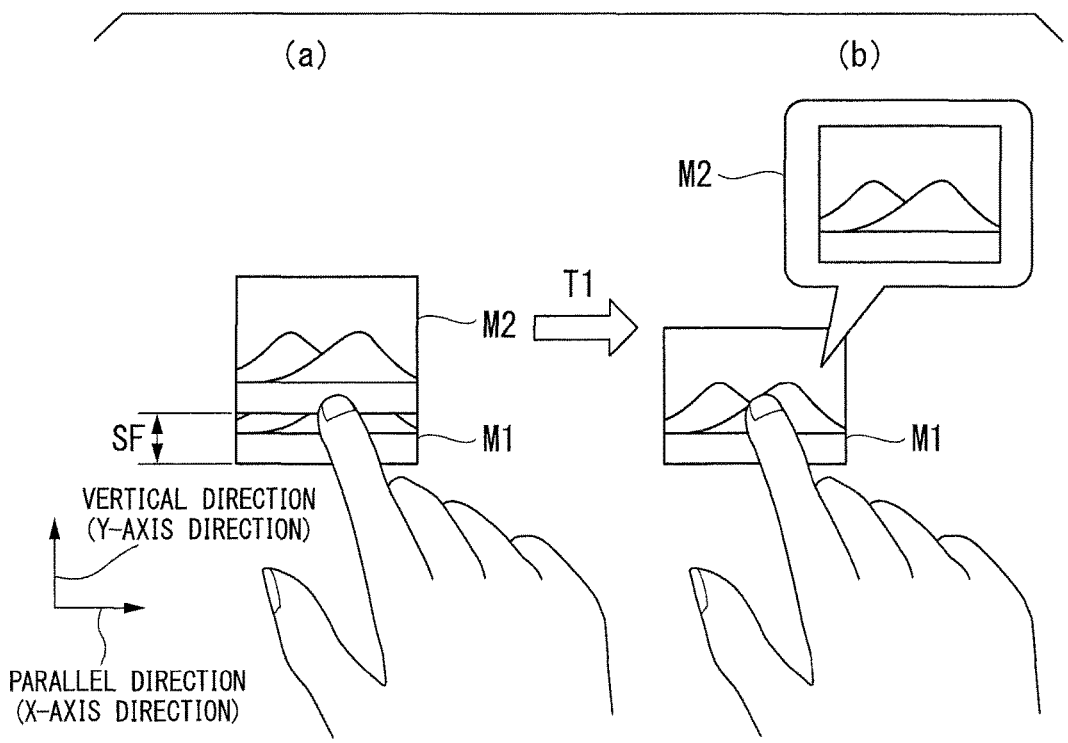
FIG. 18 is a diagram showing an example of a screen on which a related image is auxiliary displayed by a display unit according to another embodiment of the present invention.

In addition, as another method of displaying a related image, the following example can be considered. For example, as shown in FIG. 18, an example can be considered in which the control unit 106 determines at least one of the display state and the blocking state of a blocked stereoscopic image, displays an auxiliary display by performing the "shift display" to the stereoscopic image at first when the stereoscopic image, which is an object to be pointed, is blocked by an obstacle (for example, a finger or the like), and changes the display method when a state in which blocking the stereoscopic image by the obstacle is maintained for a predetermined period of time or longer. That is, an example can be considered in which the control unit 106 displays a related image by changing the display method of a related image, which is auxiliary displayed, according to the length of elapsed time for which a stereoscopic image has been continuously blocked by an obstacle.

In FIG. 18(a), an icon M1 indicates a stereoscopic image that is blocked, an icon M2 indicates a related image that is displayed by performing the "shift display" to the icon M1, and a shift amount SF indicates a distance by which the icon M1 is shifted from the position of the icon M1 to the position of the icon M2 by the "shift display".

FIG. 18(a) shows a display method in which the control unit 106 performs the "shift display" to the blocked stereoscopic image when the stereoscopic image, which is an object to be pointed, is continuously blocked by an obstacle (for example, a finger or the like) only for a period of time shorter than a predetermined time T1 from the beginning point of the blocking.

In FIG. 18(b), an icon M1 indicates a stereoscopic image that is continuously blocked by an obstacle from the situation shown in FIG. 18(a), and an icon M2 indicates a related image that is displayed by displaying the icon M1 by the "pop up display".

FIG. 18(b) shows a display method in which the control unit 106 transfers the display of a related image of the continuously blocked stereoscopic image from the "shift display", which is shown in FIG. 18(a), to the "pop up display", when a stereoscopic image, which is an object to be pointed, is continuously blocked by an obstacle (for example, a finger or the like) for a period of time longer than the predetermined time T1 from the beginning of blocking.

Thus, according to the present embodiment, when a stereoscopic image is blocked by an obstacle, the display method of a related image which is auxiliary displayed is changed according to the length of the elapsed time for which the stereoscopic image is continuously blocked by the obstacle. Therefore, the user can confirm more clearly what the blocked stereoscopic image is by viewing the related image that is auxiliary displayed. In addition, by auxiliary displaying the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

In FIG. 18, an example is shown in which the related image display is changed from the "shift display" to the "pop-up display" when the time for which a stereoscopic image is blocked is longer than the predetermined time T1. However, the display method of a related image is not limited to the method described above, and a related image may be displayed using another display method. For example, the related image display may be changed from the "pop-up display" to the "shift display".

Figure 19:
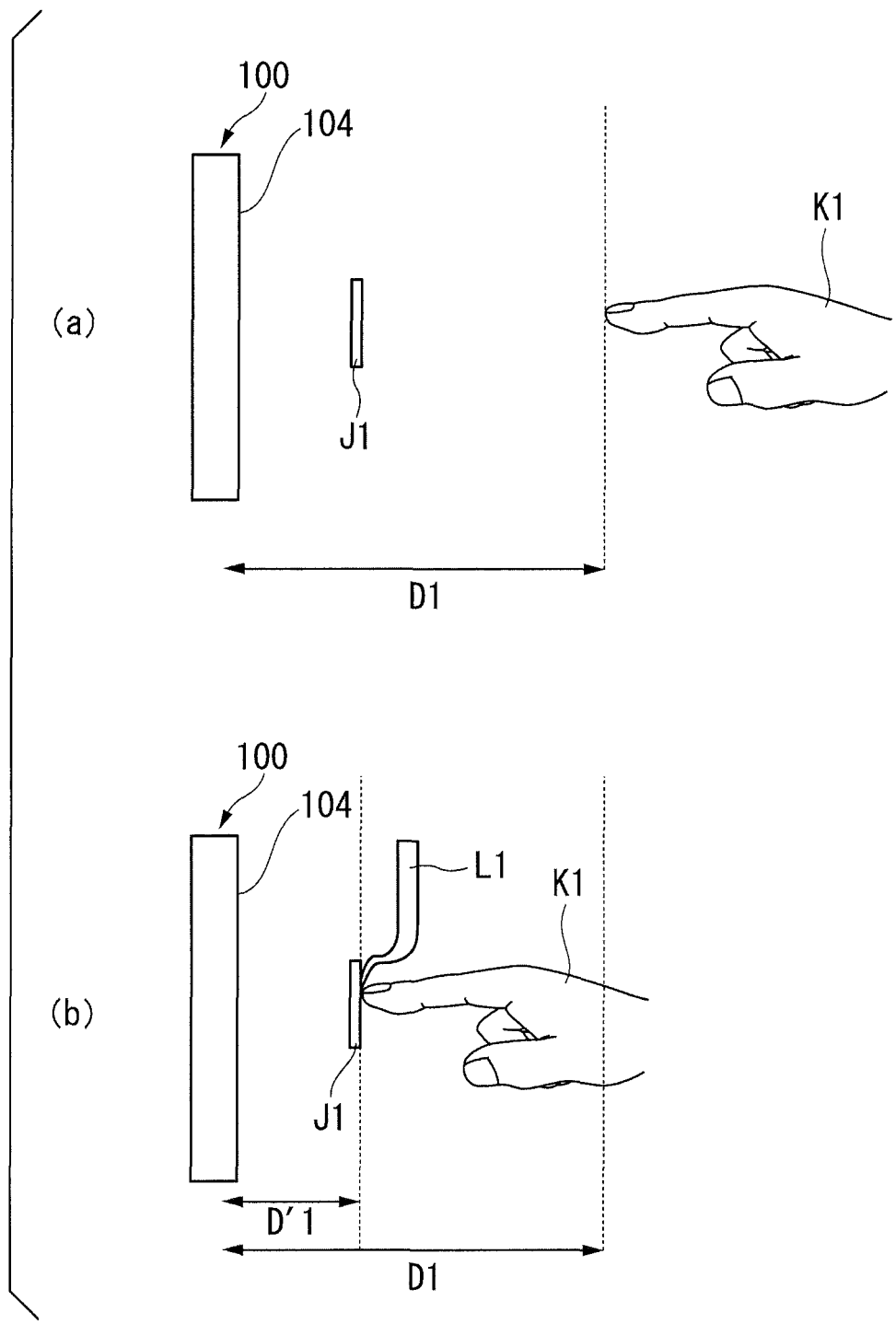
FIG. 19 is a diagram showing an example of a screen on which a related image is auxiliary displayed by a display unit according to another embodiment of the present invention.

In addition, as another method of displaying a related image, the following example can be considered. For example, as shown in FIG. 19, an example can be considered in which the control unit 106 determines at least one of the display state and the blocking state of a blocked stereoscopic image, and auxiliary displays a related image according to a time from the start of indication when the stereoscopic image, which is an object to be pointed, is indicated by an user's obstacle (for example, a finger or the like), to an actual pointing of the stereoscopic image. That is, an example can be considered in which the control unit 106 displays a related image by changing the display method of a related image, which is auxiliary displayed, according to the length of elapsed time from the start of indication of the stereoscopic image by an obstacle until a stereoscopic image is actually pointed by the obstacle. As an example, with reference to FIG. 19, a display method of the related image will be described in which the control unit 106 displays the related image by the "pop-up display" of a stereoscopic image when the elapsed time from the start of indication when the stereoscopic image is indicated by the obstacle until the stereoscopic image is actually pointed by the obstacle is longer than a predetermined time.

FIG. 19 is a diagram showing the relationship of a depth distance D1 among the display device 100 that displays a stereoscopic image J1, a hand K1 that is an obstacle, and a related image L1 that is auxiliary displayed. The depth distance D1 is a distance in the depth direction in the Z-axis direction. The depth distance D1 is an indication start position used when the detection unit 102 determines whether or not indication by the obstacle K1 has started. As shown in FIG. 19(a), the detection unit 102 determines that the user has indicated the stereoscopic image J1 when the obstacle K1 is present at a position closer to the display device 100 than the depth distance D1. The detection unit 102 determines the start of the indication by the obstacle K1 according to whether the position of the obstacle K1 is closer to or farther from the display device 100 than the indication start position (depth distance D1). Then, as shown in FIG. 19(b), the control unit 106 measures an elapsed time T2 until the user actually points the stereoscopic image J1 at the position of a depth distance D'1 with the obstacle K1 from the time at which the detection unit 102 determined that the user has started indicating the stereoscopic image J1. The control unit 106 auxiliary displays the related image L1 as the "pop-up display" when the elapsed time T2 is longer than a predetermined time.

On the other hand, for example, when the elapsed time T2 from the start of indication of the stereoscopic image J1 by the obstacle K1 until the stereoscopic image J1 is actually pointed by the obstacle is shorter than the predetermined time, the control unit 106 auxiliary displays the related image L1 as the "shift display" (not shown).

Thus, according to the present embodiment, when a stereoscopic image is blocked by an obstacle, the display method for displaying a related image to be auxiliary displayed is changed according to the length of elapsed time from the start of indication of the stereoscopic image by the obstacle until the stereoscopic image is actually pointed by the obstacle. Therefore, the user can confirm more clearly what the blocked stereoscopic image is by viewing the related image that is auxiliary displayed. In addition, by auxiliary displaying the related image of the blocked stereoscopic image, it is possible to highlight the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

In addition, as another method of displaying a related image, the following example can be considered. For example, as shown in FIG. 20, an example can be considered in which the control unit 106 determines at least one of the display state and the blocking state of a blocked stereoscopic image, and selects the display position of a related image, which is auxiliary displayed, according to a positional relationship between the stereoscopic image, which is an object to be pointed, and a display object other than the stereoscopic image, which is displayed around the stereoscopic image.

More specifically, for example, when performing auxiliary display for a stereoscopic image blocked by an obstacle, if another icon is displayed on the screen around the stereoscopic image, the control unit 106 auxiliary displays a related image at a position away from the another icon to prevent interference with the another icon. As a result, it is possible to further improve the visibility. As an example, a display method in which the control unit 106 displays a related image by "pop-up display" when another display object (icon) is displayed around a blocked stereoscopic image will be described with reference to FIG. 20.

Figure 20:
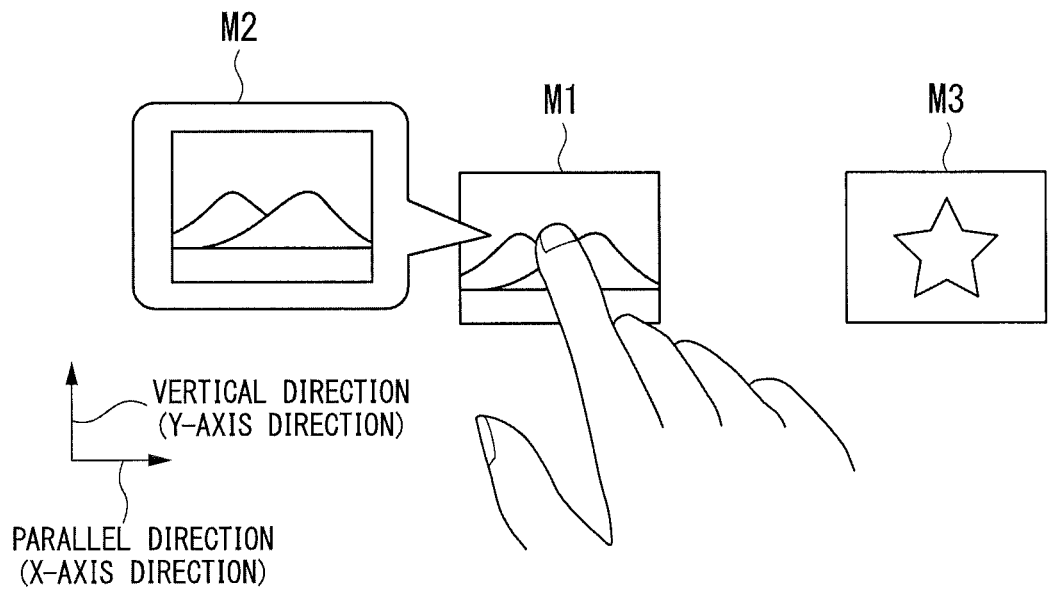
FIG. 20 is a diagram showing an example of a screen on which a related image is auxiliary displayed by a display unit according to another embodiment of the present invention.

In FIG. 20, an icon M1 indicates a blocked stereoscopic image, and an icon M2 indicates a related image that is displayed by displaying the icon M1 so as to pop up. In addition, an icon other than the blocked icon M1, for example, an icon M3 is displayed around the icon M1.

In such a case, for example, when the icon M1 is blocked by an obstacle, such as a finger, the control unit 106 displays the icon M2 as a related image by displaying the blocked icon M1 (stereoscopic image) by the "pop-up display". In this case, the control unit 106 causes the icon M2 to pop up at a position, which does not interfere with the icon M3, under a consideration of the position where the icon M3 is displayed.

In the example shown in FIG. 20, since another icon M3 is displayed on the right side of the stereoscopic image M1 that is an object to be pointed, a display method using "pop-up display" is shown as an example of displaying the related image M2, which is auxiliary displayed, at a position in the opposite direction of the position where another icon M3 is displayed. The method of displaying a related image that is auxiliary displayed is not limited to the "pop-up display", and the control unit 106 can display a related image by determining an appropriate display method according to the screen display situation around a blocked stereoscopic image so that the related image to be auxiliary displayed does not interfere with a surrounding display object.

Thus, according to the present embodiment, when a stereoscopic image is blocked by an obstacle, the display method of displaying a related image to be auxiliary displayed is changed according to the positional relationship between the stereoscopic image, which is an object to be pointed, and a display object other than the stereoscopic image, which is displayed around the stereoscopic image. Therefore, the user can confirm more clearly what the blocked stereoscopic image is by viewing the related image that is auxiliary displayed. In addition, by auxiliary displaying the related image of the blocked stereoscopic image, it is possible to highlight the content of the stereoscopic image so as to make it easily recognizable by the user.

In particular, since a related image can be displayed by determining an appropriate display method according to the screen display situation around a blocked stereoscopic image so that the related image to be auxiliary displayed does not interfere with a surrounding display object, it is possible to further highlight the related image so as to make it easily recognizable by the user. In addition, since the displayed related image is not blocked by the obstacle, the user can view the related image with both eyes. As a result, it is possible to reduce eye fatigue of the user without causing any discomfort of the user, such as binocular rivalry.

Figure 21:
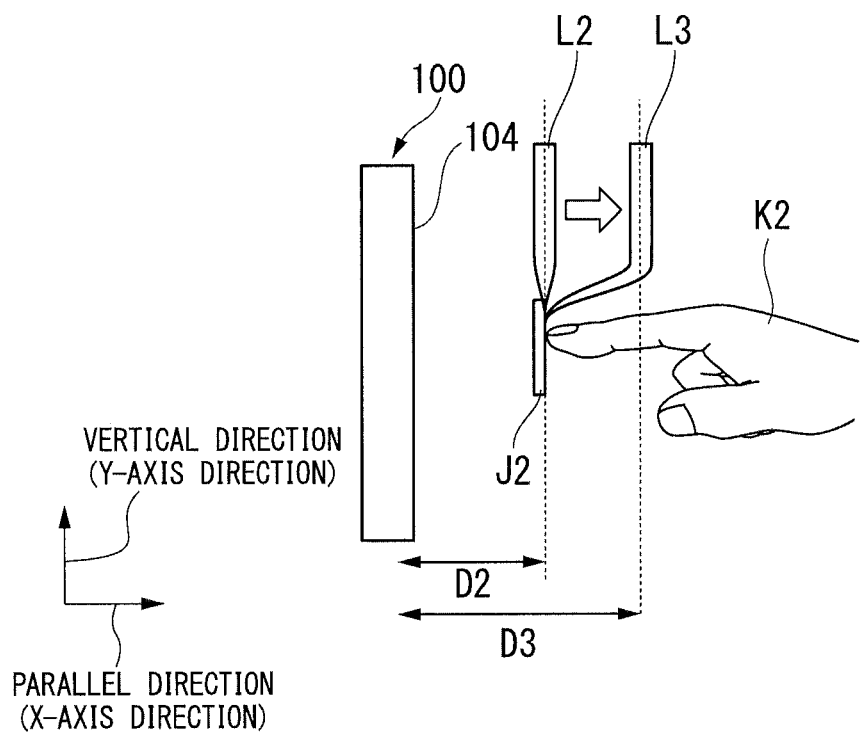
FIG. 21 is a diagram showing an example of a screen on which a related image is auxiliary displayed by a display unit according to another embodiment of the present invention.

In addition, as another method of displaying a related image, the following example can be considered. For example, as shown in FIG. 21, an example can be considered in which the control unit 106 determines at least one of the display state and the blocking state of a blocked stereoscopic image, and displays an auxiliary display with the same amount of parallax as for the stereoscopic image when the stereoscopic image, which is an object to be pointed, is blocked by the user's obstacle (for example, a finger or the like) and then subsequently displays a related image while continuously changing the amount of parallax up to predetermined display parallax. As an example, with reference to FIG. 21, a related image display method in which the control unit 106 displays a "pop-up display" with the same amount of parallax as for a stereoscopic image and then subsequently displays a "pop-up display" while continuously changing the amount of parallax in this "pop-up display" up to predetermined display parallax.

FIG. 21 is a diagram showing the relationship of a depth distance D2 among the display device 100 that displays a stereoscopic image J2, a hand K2 that is an obstacle, and a related image L2 that is auxiliary displayed. The depth distance D2 is a distance in the depth direction from the display device 100 to a position, at which the stereoscopic image J2 is displayed, in the Z-axis direction. In addition, a related image L3, which is displayed by continuously changing the amount of parallax from the related image L2 up to predetermined display parallax, is displayed at a position of a depth distance D3.

When the stereoscopic image J2 is blocked by the hand K2 as an obstacle, the control unit 106 displays the "pop-up display" of the related image L2 at the position of the depth distance D2 with the same amount of parallax as for the stereoscopic image J2. Then, the control unit 106 displays the "pop-up display" of the related image L3 at the position of the depth distance D3 by continuously changing the amount of parallax of the related image L2, which is displayed as the "pop-up display" at the position of the depth distance D2, up to predetermined display parallax. That is, the control unit 106 displays a related image of a stereoscopic image blocked by an obstacle while continuously changing the amount of parallax from the same amount of parallax as for the stereoscopic image to predetermined display parallax so that the related image looks to the user like the related image floats frontward.

In addition, for example, the direction in which the amount of parallax of the related image L2, which is displayed as the "pop-up display" at the position of the depth distance D2, is continuously changed is not limited to the direction which moves away from the display device 100 at the position of the depth distance D3, and it is also possible to use a display method to display a related image by continuously changing the amount of parallax of the related image L2 in a direction approaching the display device 100.

In FIG. 21, an example is shown in which a related image is displayed by the "pop-up display". However, for example, a related image that is displayed while continuously changing parallax may be displayed using other display methods, such as a "shift display".

Thus, according to the present embodiment, when a stereoscopic image is blocked by an obstacle, an auxiliary display is displayed with the same amount of parallax as for the stereoscopic image, and then subsequently a related image is displayed while continuously changing the amount of parallax up to predetermined display parallax. Therefore, the user can confirm more clearly what the blocked stereoscopic image is by viewing the related image that is auxiliary displayed. In addition, by auxiliary displaying the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry.

When auxiliary displaying a related image with the amount of parallax that is different from that of a blocked stereoscopic image, if the related image with the amount of parallax different from the amount of parallax of the stereoscopic image is instantaneously displayed around the stereoscopic image, parallax viewing of the user from the stereoscopic image to the related image can be difficult to follow the display. Accordingly, there is a possibility that it is hard for the user to view the related image that is auxiliary displayed. For this reason, as shown in the display method described above, by changing the amount of parallax of the stereoscopic image up to the amount of parallax of a predetermined related image at a temporally continuous manner, it becomes possible for the user to easily view the related image that is auxiliary displayed.

Figure 22:
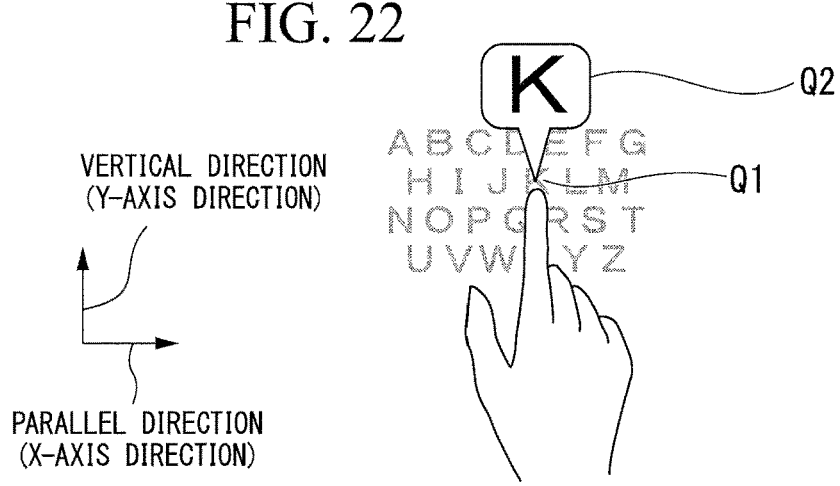
FIG. 22 is a diagram showing an example of a screen on which a related image is auxiliary displayed by a display unit according to another embodiment of the present invention.

In addition, as another method of displaying a related image, the following example can be considered. For example, as shown in FIG. 22, an example can be considered in which, when a stereoscopic image, which is an object to be pointed, is blocked by an obstacle (for example, a finger or the like), the control unit 106 determines at least one of the display state and the blocking state of the blocked stereoscopic image, and displays a display object around a related image, which is auxiliary displayed, so as to be blurred. More specifically, for example, an example can be considered to display a related image in a conspicuous manner by softening the display of the surrounding display object which excludes the portion where a prominence is given by a three-dimensional display (related image). In addition, as an example of the method of blurring a display object around the related image, softening the display of the surrounding display object, changing the contrast value of the display of the surrounding display object, or changing the a value (transparency) of the display of the surrounding display object can be considered, for example.

Similar to the above described FIG. 15, FIG. 22 shows an example in which the control unit 106 displays a related image Q2, which is auxiliary displayed, with a display method in which the related image Q2 is displayed at a position away from a stereoscopic image Q1 as the texture density or distribution around the stereoscopic image Q1 is larger. In addition, in FIG. 22, the control unit 106 displays the related image Q2, which is auxiliary displayed, in a conspicuous manner by softening (blurred) the display object around the blocked stereoscopic image Q1.

Thus, according to the present embodiment, when a stereoscopic image is blocked by an obstacle, a related image is displayed by enlarging the stereoscopic image with a "pop-up display" at a position away from the obstacle, and furthermore, a display of the display object displayed around the related image is softened (blurred). Therefore, the user can confirm more clearly what the blocked stereoscopic image is by viewing the related image that is auxiliary displayed. In addition, by auxiliary displaying the related image of the blocked stereoscopic image, it is possible to highlight the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry. In addition, since the display of the display object around the blocked stereoscopic image is softened (blurred), it is possible to more effectively suppress the binocular rivalry of the user that occurs at the boundary between the obstacle and the surrounding display object.

The method of displaying a display object around a blocked stereoscopic image in a blurred manner is not limited to the display method of softening the display of the surrounding display object as shown in FIG. 22, and a related image that is auxiliary displayed may be displayed in a conspicuous manner by changing the contrast value or the a value of the surrounding display object. In addition, a related image that is auxiliary displayed may be displayed in a conspicuous manner by changing the ratio of the contrast values or the a values of the auxiliary displayed related image and the surrounding display object.

In addition, as another method of displaying a related image, the following example can be considered. In general, binocular rivalry of the user is likely to occur as the difference between the right-eye image applied to the right eye of the user and the left-eye image applied to the left eye of the user increases. For example, if the degree of matching (degree of coincidence) between the right-eye image and the left-eye image of the user is high, the binocular rivalry is less likely to occur. In contrast, if the degree of matching (degree of coincidence) between the right-eye image and the left-eye image of the user is low, the binocular rivalry is likely to occur. That is, as the difference between the right-eye image and the left-eye image of the user increases, the binocular rivalry is likely to occur.

Therefore, for example, an example can be considered in which, when a stereoscopic image that is an object to be pointed is blocked by an obstacle (for example, a finger or the like), the control unit 106 determines a difference between the right-eye image applied to the right eye of the user and the left-eye image applied to the left eye of the user and selects or changes a display method of a related image, which is auxiliary displayed, according to the magnitude of the difference. That is, an example can be considered in which a display method of a related image, which is auxiliary displayed, is changed according to the degree of matching (matching degree) between the right-eye image and the left-eye image of the user who views a stereoscopic image blocked by an obstacle.

Thus, according to the present embodiment, a related image is displayed by selecting or changing a display method, in which the binocular rivalry of the user is less likely to occur, according to the degree of matching (degree of coincidence) between the right-eye image and the left-eye image of the user who views a stereoscopic image blocked by an obstacle. Therefore, the user can confirm more clearly what the blocked stereoscopic image is by viewing the related image that is auxiliary displayed. In addition, by auxiliary displaying the related image of the blocked stereoscopic image, it is possible to highlight the content of the stereoscopic image so as to make it easily recognizable by the user. Since the displayed related image is not blocked by the obstacle, the user can view the related image with both eyes. As a result, it is possible to reduce eye fatigue of the user without causing any discomfort of the user, such as binocular rivalry. In addition, since a display method can be selected or changed depending on the likelihood of binocular rivalry of the user, it is possible to display a related image by a more appropriate display method.

Figure 23:
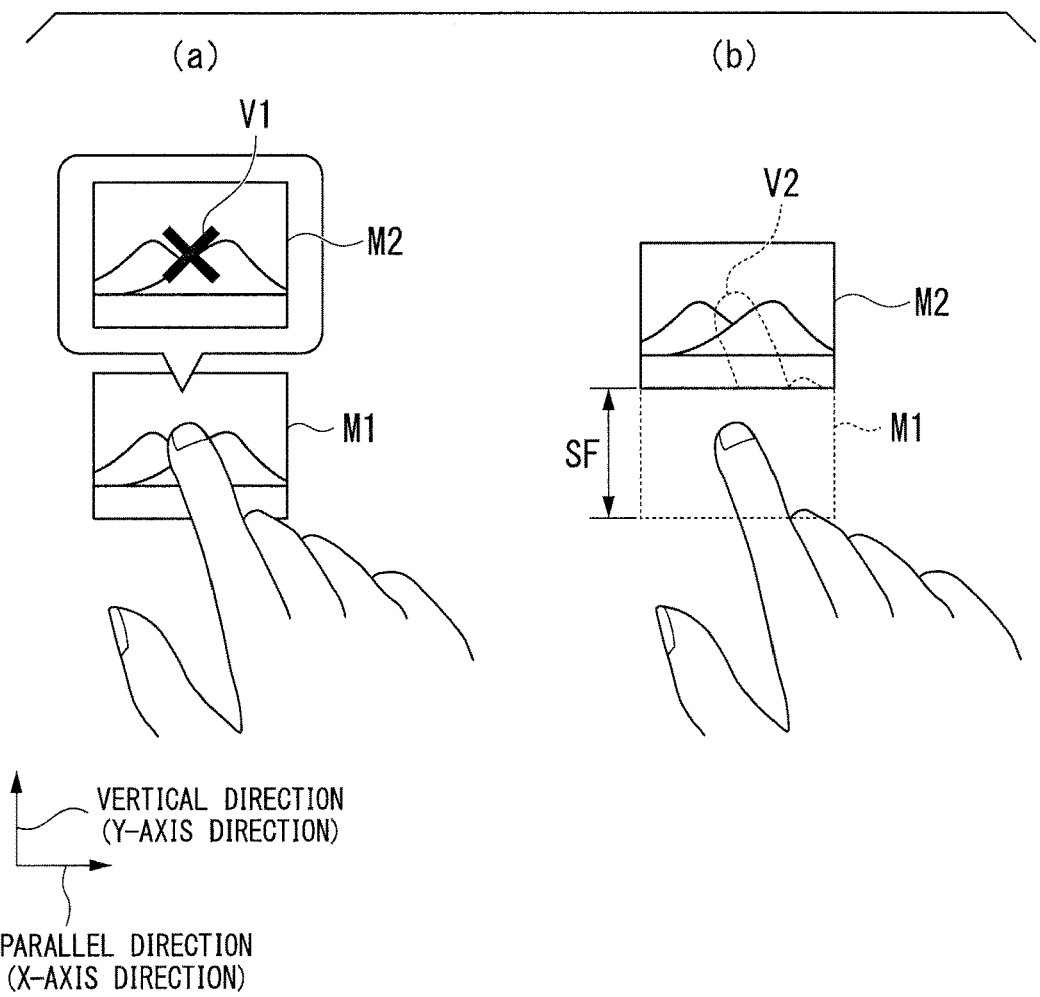
FIG. 23 is a diagram showing an example of a screen on which a related image is auxiliary displayed by a display unit according to another embodiment of the present invention.

FIG. 23 is an example of an icon M2 that is a related image displayed by displaying an icon M1, which is a stereoscopic image, with a "pop-up display" when the stereoscopic image is blocked by an obstacle. For example, while a region where the icon M1 is displayed is blocked by the user, the control unit 106 may display a marker V1 in the central portion of the icon M2 as shown in FIG. 23(a). In FIG. 23(a), an example in which an X mark is displayed in the central portion of the icon M2 is shown as an example of the marker V1.

FIG. 23(b) is an example of an icon M2 that is a related image displayed by shifting an icon M1, which is a stereoscopic image, with a "shift display" when the stereoscopic image is blocked by an obstacle. In this case, while a region where the icon M1 is displayed is blocked by the user, the control unit 106 may display a marker V2 in the central portion of the icon M2 as shown in FIG. 23(b). In FIG. 23(b), an example in which the outline of an obstacle (a finger or the like) is displayed translucently on the icon M2 is shown as an example of the marker V2.

Figure 24:
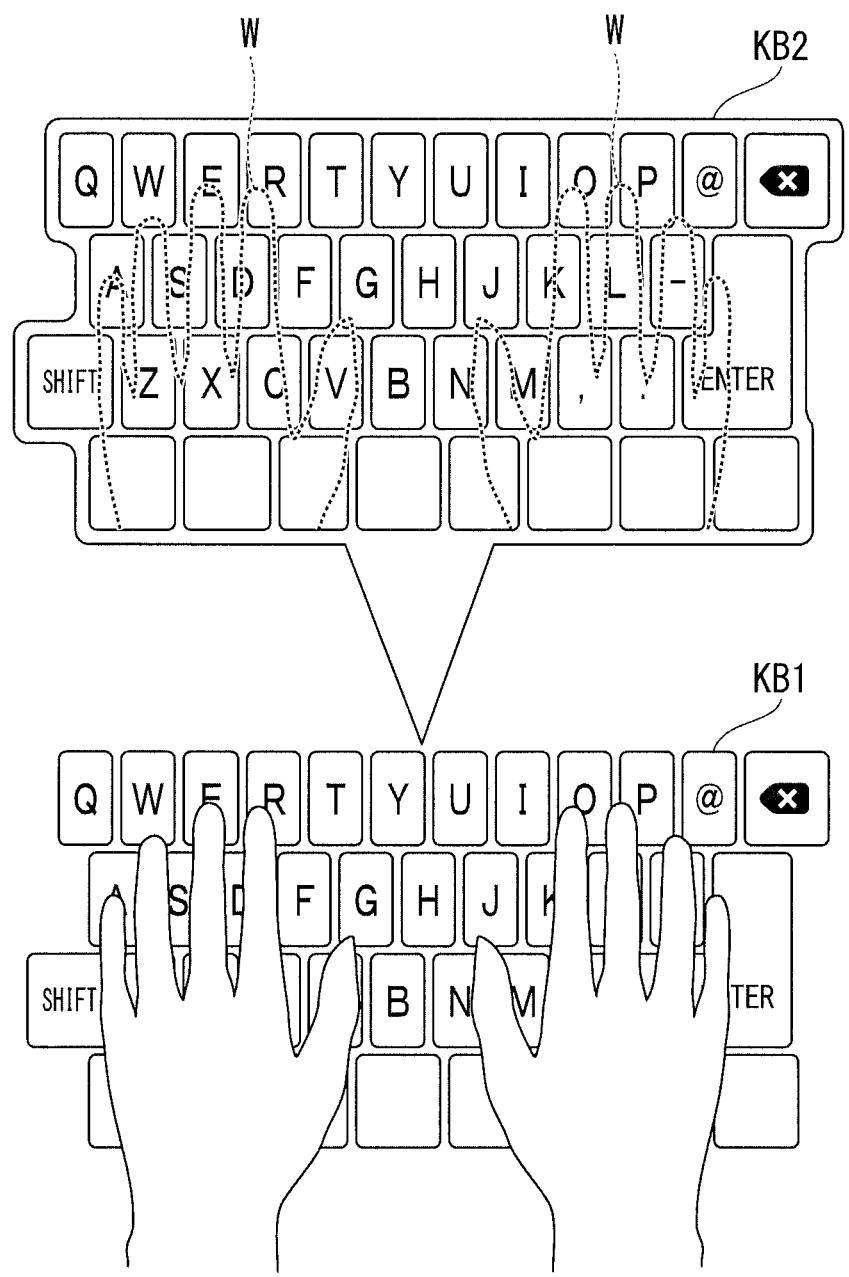
FIG. 24 is a diagram showing an example of a screen on which a related image is auxiliary displayed by a display unit according to another embodiment of the present invention.

As shown in FIG. 24, for example, it is also possible to display a keyboard KB1 as a stereoscopic image that is an object to be pointed and display a keyboard KB2, which is a related image corresponding to a keyboard blocked by the finger of the user, with the finger of the user, who performs an operation of hitting a key on the keyboard KB1, as an obstacle. In this case, the control unit 106 may display a marker W on the keyboard KB2 that is auxiliary displayed as shown in FIG. 24. In FIG. 24, an example in which the outline of an obstacle (a finger or the like) is displayed translucently on the related image KB2 is shown as an example of the marker W.

By displaying the markers shown in FIGS. 23 and 24 on a displayed related image, the user can grasp a stereoscopic image, which is blocked by an obstacle, more easily. That is, the user can grasp a stereoscopic image, which is selected or indicated by an obstacle, more easily. For this reason, when a related image is displayed around a blocked stereoscopic image by the "pop-up display" or the "shift display", the user can easily recognize the stereoscopic image indicated by himself or herself and the displayed related image by associating them with each other. Therefore, since the user can easily understand the situation where the stereoscopic image indicated by himself or herself is displayed as a related image, it is possible to prevent confusion or frustration of the user when a related image, such as a "pop-up display" or a "shift display", is displayed.

In any of the embodiments described above, when a stereoscopic image is blocked by an obstacle, a part of a related image that is auxiliary displayed in a region adjacent to the stereoscopic image may be displayed so as to overlap the blocked stereoscopic image. In addition, a part of a related image that is auxiliary displayed in a region adjacent to a stereoscopic image may be displayed so as to overlap an obstacle that blocks the stereoscopic image. That is, the entire related image that is auxiliary displayed does not necessarily need to be displayed in a region not overlapping the blocked stereoscopic image. In addition, the entire related image that is auxiliary displayed does not necessarily need to be displayed in a region that is not blocked by an obstacle.

In addition, the related image display methods in the embodiments described above are just examples of the display method. The related image display methods described above can be used to display a related image by being appropriately combined.

In addition, display control may be performed by recording a program for realizing the function of each processing unit in the present invention on a computer-readable recording medium, reading the program recorded on the recording medium into the computer system, and executing the read program. In addition, it is assumed that the "computer system" referred to herein includes an OS or hardware, such as peripheral devices. In addition, it is assumed that the "computer system" also includes a WWW system having a homepage providing environment (or a display environment). In addition, examples of the "computer-readable recording medium" include portable media, such as a flexible disk, a magneto-optic disc, a ROM, and a CD-ROM, and a storage device, such as a hard disk built in a computer system. In addition, it is assumed that the "computer-readable recording medium" also includes a medium that stores a program for a predetermined period of time like a volatile memory (RAM) in a computer system, which serves as a server or a client when a program is transmitted through a network, such as the Internet, or a communication line, such as a telephone line.

In addition, the above-described program may also be transmitted from a computer system, which has a storage unit or the like that stores the program, to other computer systems through a transmission medium or a transmission wave in the transmission medium. Here, the "transmission medium" to transmit a program refers to a medium having a function of transmitting information, such as a network (communication network) including the Internet or a communication line including a telephone line. In addition, the above-described program may be provided to realize a part of the function described above. In addition, the program may be a so-called differential file (differential program) that can realize the above function in combination with a program already recorded in a computer system.

DESCRIPTION OF THE REFERENCE SYMBOLS

100: display device
101: imaging unit
102: detection unit
103: operation determination unit
104: display unit
105: display image storage unit
106: control unit

The invention claimed is:

1. A controlling device that controls a display device to display an image for forming a midair image, the midair image being in a position in air at which the image is projected away from the display device, the image including a first display, and the controlling device comprising:
a processor that:
controls the display device to display a second display relating to a part of the first display based on information regarding a position of an object between the first display and the region from which the first display can be observed or a position of an object between the first display and a user; and
controls to dynamically change a displayed position of the second display in a depth direction, which is a direction that intersects with a plane on which the first display is displayed, the displayed position of the second display being dynamically changed between a first position and a second position,
wherein in the depth direction, the first display is at a position between the first position and the second position.

2. The controlling device according to claim 1,
wherein the processor controls the display device to display the second display at a position different from a position where the part of the first display is displayed.

3. The controlling device according to claim 1,
wherein the second display is an auxiliary display of the part of the first display.

4. The controlling device according to claim 3,
wherein the second display is a display including the part of the first display.

5. The controlling device according to claim 1,
wherein the processor controls the display device to display the second display relating to a region blocked by the object among the first display based on the information regarding the position of the first display, the position of a region from which the first display can be observed, and the position of the object.

6. The controlling device according to claim 5,
wherein the processor determines the region blocked by the object based on the information regarding the position of the first display, the position of a region from which the first display can be observed, and the position of the object.

7. The controlling device according to claim 5,
wherein the processor changes a position of the second display based on a region different from the region blocked by the object.

8. The controlling device according to claim 5,
wherein the processor controls the display device to display the second display based on a length of time the object blocks the first display.

9. The controlling device according to claim 8,
wherein the processor controls the display device to display the second display in a case a length of elapsed time blocking the first display is longer than a predetermined length of time.

10. The controlling device according to claim 8,
wherein the processor controls the display device to change a display state of the second display based on the length of elapsed time blocking the first display.

11. The controlling device according to claim 5,
wherein the processor controls the display device to change a size of the second display based on a size of the region blocked by the object.

12. The controlling device according to claim 1,
wherein the processor obtains information regarding a position of the object detected by a detector.

13. The controlling device according to claim 1,
wherein the processor obtains information regarding a position of an eye of the user detected by a detector and cause the display device to display the second display based on the position of the eye of the user.

14. The controlling device according to claim 1,
wherein the processor controls the display device to display the second display at a position that is the same as the first display in a direction from the first display toward the user.

15. The controlling device according to claim 1,
wherein the processor controls the display device to display the second display at a position that is different from the first display in a direction from the first display toward the user.

16. The controlling device according to claim 1,
wherein the object is a hand or a finger of the user.

17. The controlling device according to claim 16,
wherein the first display is operated by the hand or the finger of the user.

18. The controlling device according to claim 1,
wherein the processor controls the display device to display the second display in midair.

19. The controlling device according to claim 18,
wherein the processor controls a position of the second display in the midair based on information regarding the position of the region from which the first display can be observed and the position of the object.

20. The controlling device according to claim 19,
wherein the processor moves the position of the second display in the midair in a direction approaching a display surface of the display device or in a direction away from the display surface of the display device based on the information regarding the position of the region from which the first display can be observed and the position of the object.

21. The controlling device according to claim 1,
wherein the processor controls a contrast of a part of the second display to increase to more than a contrast of a part of the first display.

22. The controlling device according to claim 1,
wherein the processor controls a transparency of a part of the second display to decrease to less than a transparency of a part of the first display.

23. The controlling device according to claim 1,
wherein the processor controls the first display when a location of the object is substantially the same as a location of the first display.

24. The controlling device according to claim 1,
wherein the processor controls the display device to display the second display in a state in which the first display is displayed.

25. A detecting device comprising:
a detector that detects information regarding a position of an object; and
the controlling device according to claim 10.

26. A detecting device comprising:
a detector that detects information regarding a position of an object; and
the controlling device according to claim 11.

27. A display system comprising:
a display device that displays a first display in midair, which is a position in air to which the first display is projected away from the display device; and
the controlling device according to claim 1.

28. An electronic device, comprising:
a display device that displays a first display in midair, which is a position in air to which the first display is projected away from the display device; and
the controlling device according to claim 1.

29. The controlling device according to claim 1, wherein the processor controls the display device to display the second display relating to the part of the first display further based on information regarding a position of the first display in midair.

30. The controlling device according to claim 1, wherein the processor controls the display device to display the second display relating to the part of the first display further based on information regarding a position of a region from which the first display can be observed.

31. The controlling device according to claim 1, wherein the range of positions in which the second image is controlled to be displayed is defined by a first position, which is farther from the display unit than the first display, and a second position, which is closer to the display unit than the first display.

\* \* \* \* \*